(12) United States Patent  (10) Patent No.: US 8,608,527 B2
O'Connor et al.  (45) Date of Patent: Dec. 17, 2013

(54) WALL MOUNTED TOY TRACK SET

(75) Inventors: Stacy L. O'Connor, Long Beach, CA (US); Eric Ostendorff, Torrance, CA (US); Paul Schmid, Ojai, CA (US); Michael Nuttall, South Pasadena, CA (US); Sun Leung, Hong Kong (CN); Eric So, Hong Kong (CN); Glenn Yu, San Marino, CA (US); Amanda L. Bright, Redondo Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 13/220,364

(22) Filed: Aug. 29, 2011

(65) Prior Publication Data

US 2012/0164914 A1  Jun. 28, 2012

Related U.S. Application Data

(60) Provisional application No. 61/377,743, filed on Aug. 27, 2010, provisional application No. 61/480,793, filed on Apr. 29, 2011.

(51) Int. Cl.
*A63H 18/00* (2006.01)

(52) U.S. Cl.
USPC ................. 446/444; 104/69; 248/231.91

(58) Field of Classification Search
USPC ............. 446/444–446; 248/231.91; 33/365; 104/69
See application file for complete search history.

(56) References Cited

U.S. PATENT DOCUMENTS

| 469,948 A | 3/1892 | Reed |
| 806,930 A | 12/1905 | Smith |
| 812,595 A | 2/1906 | Roberts |
| 831,907 A | 9/1906 | Townsend |
| 889,169 A | 6/1908 | Brothen |
| 1,113,945 A | 10/1914 | Bain |
| 1,116,577 A | 11/1914 | Dugger |

(Continued)

FOREIGN PATENT DOCUMENTS

| JP | 07-328241 A | 12/1995 |
| WO | 88-04191 A1 | 6/1988 |

OTHER PUBLICATIONS

International Search Report dated Apr. 9, 2012 for International Application No. PCT/US2011/049587.

(Continued)

*Primary Examiner* — Jason C Smith
(74) *Attorney, Agent, or Firm* — Cantor Colburn LLP

(57) ABSTRACT

A track set and a plurality of wall mounts is disclosed herein, each of the plurality of wall mounts having: a planar member; a mount member configured to be snap fittingly engaged into the planar member; wherein the mount member is configured to releasably engage a front surface of the planar member and wherein the front surface of planar member further comprises a ledge portion that is configured to engage a bottom portion of the mount member and a1 feature that is configured to engage an upper portion of the mount member. The track set having a first track segment configured to engage at least one of the plurality of wall mounts and direct an object in a first direction generally down the first track segment; and a U-turn device configured to receive the object from the first track segment and redirect the object it in a direction substantially opposite to the first direction down a second track segment. The second track segment being configured to engage at least another one of the plurality of wall mounts.

23 Claims, 28 Drawing Sheets

(56) References Cited

U.S. PATENT DOCUMENTS

| | | | |
|---|---|---|---|
| 1,209,127 | A | 12/1916 | Corey |
| 1,244,457 | A | 10/1917 | Bain |
| 1,244,702 | A | 10/1917 | Christ |
| 1,247,226 | A | 11/1917 | Cole |
| 1,252,616 | A | 1/1918 | Reif |
| 1,261,691 | A | 4/1918 | Bunkley |
| 1,279,271 | A | 9/1918 | Cole |
| 1,284,477 | A | 11/1918 | Seils |
| 1,287,450 | A | 12/1918 | Sabina et al. |
| 1,287,608 | A | 12/1918 | Austin |
| 1,295,504 | A | 2/1919 | Howard et al. |
| 1,301,552 | A | 4/1919 | Gaines |
| 1,314,238 | A | 8/1919 | Bain |
| 1,315,108 | A | 9/1919 | Gaines |
| 1,317,184 | A | 9/1919 | Voss |
| 2,672,709 | A | 9/1919 | Ernst |
| 2,756,687 | A | 9/1919 | Fields |
| RE14,902 | E | 6/1920 | Gaines |
| 1,347,968 | A | 7/1920 | O'Doie |
| 1,351,981 | A | 9/1920 | Zipf |
| 1,355,636 | A | 10/1920 | Bain |
| 1,361,449 | A | 12/1920 | Danner |
| 1,392,727 | A | 10/1921 | Welsh |
| 1,454,173 | A | 5/1923 | Keiner |
| 1,472,783 | A | 11/1923 | Bauer |
| 1,478,350 | A | 12/1923 | Okel |
| RE15,900 | E | 8/1924 | Hetzner |
| 1,523,244 | A | 1/1925 | Bain |
| 1,527,006 | A | 2/1925 | O'Reilly |
| 1,546,377 | A | 7/1925 | Gunderman |
| 1,560,181 | A | 11/1925 | Marx |
| 1,561,633 | A | 11/1925 | Bain |
| 1,568,492 | A | 1/1926 | Zabel |
| 1,599,699 | A | 9/1926 | Zabel |
| 1,599,982 | A | 9/1926 | Bauer |
| 1,617,846 | A | 2/1927 | Hawk |
| RE16,791 | E | 11/1927 | Hawk |
| 1,666,417 | A | 4/1928 | Harris |
| 1,696,532 | A | 12/1928 | Enloe |
| RE17,312 | E | 6/1929 | Beck |
| 1,715,891 | A | 6/1929 | Beck |
| 1,724,447 | A | 8/1929 | Abbott et al. |
| 1,725,536 | A | 8/1929 | Marx |
| 1,739,719 | A | 12/1929 | Gunderman |
| 1,748,184 | A | 2/1930 | Nichols |
| 1,758,061 | A | 5/1930 | Rentz et al. |
| 1,870,586 | A | 8/1932 | Platakis |
| 1,872,204 | A | 8/1932 | Wily |
| 2,128,863 | A | 8/1938 | Turrian |
| 2,249,728 | A | 7/1941 | Cross |
| 2,336,773 | A | 12/1943 | Black et al. |
| 2,391,529 | A | 12/1945 | Walker |
| 2,392,722 | A | 1/1946 | Burlin |
| 2,400,013 | A | 5/1946 | Lowell et al. |
| 2,400,410 | A | 5/1946 | Hatcher |
| 2,419,990 | A | 5/1947 | Dishmaker |
| 2,434,571 | A | 1/1948 | Long |
| 2,531,564 | A | 11/1950 | Garbe |
| 2,616,699 | A | 11/1952 | Franks |
| 2,655,116 | A | 10/1953 | Gowland |
| 2,785,504 | A | 3/1957 | Kooistra, Sr. |
| 2,853,301 | A | 9/1958 | Glass |
| 2,998,673 | A * | 9/1961 | Rhodes ......................... 446/168 |
| 2,999,689 | A | 9/1961 | Litwinczuk |
| 3,251,155 | A | 5/1966 | Bjork |
| 3,298,692 | A | 1/1967 | Glass et al. |
| 3,300,891 | A | 1/1967 | Glass et al. |
| 3,314,169 | A * | 4/1967 | Wold ........................... 434/189 |
| 3,343,793 | A | 9/1967 | Waser |
| 3,401,484 | A | 9/1968 | Anslover |
| 3,542,366 | A | 11/1970 | Schocker |
| 3,570,171 | A | 3/1971 | Shook |
| 3,572,713 | A | 3/1971 | Krause |
| 3,600,849 | A | 8/1971 | Faller |
| 3,621,602 | A | 11/1971 | Barcus et al. |
| 3,633,308 | A | 1/1972 | Yang |
| 3,666,264 | A | 5/1972 | Bartlett |
| 3,708,116 | A | 1/1973 | Woodward |
| 3,712,538 | A | 1/1973 | Starr et al. |
| 3,726,476 | A | 4/1973 | Porter et al. |
| 3,734,404 | A | 5/1973 | Baynes et al. |
| 3,735,923 | A | 5/1973 | Brigham et al. |
| 3,795,983 | A | 3/1974 | Gallagher et al. |
| 3,818,628 | A | 6/1974 | Ensmann et al. |
| 3,860,238 | A | 1/1975 | Kojima |
| 3,908,303 | A | 9/1975 | McKay et al. |
| 4,037,355 | A | 7/1977 | Street |
| 4,055,913 | A | 11/1977 | Sindelar |
| 4,068,402 | A | 1/1978 | Tanaka |
| 4,091,561 | A | 5/1978 | Kimura |
| 4,094,089 | A | 6/1978 | Sano |
| 4,128,964 | A | 12/1978 | Ogasawara |
| 4,140,276 | A | 2/1979 | Halford |
| 4,146,991 | A | 4/1979 | Sano |
| 4,159,593 | A | 7/1979 | Miller |
| 4,161,279 | A | 7/1979 | Halford |
| 4,185,409 | A | 1/1980 | Cheng |
| 4,195,776 | A | 4/1980 | Lehmann |
| 4,203,247 | A | 5/1980 | Moe et al. |
| 4,219,198 | A | 8/1980 | Meyer et al. |
| 4,223,834 | A | 9/1980 | Fechter |
| 4,249,733 | A | 2/1981 | Eddins et al. |
| 4,254,576 | A | 3/1981 | Matsumoto et al. |
| 4,267,661 | A | 5/1981 | Hanson |
| 4,291,488 | A | 9/1981 | Orenstein |
| 4,301,613 | A | 11/1981 | Kooistra, Sr. |
| 4,312,149 | A | 1/1982 | Iwao |
| 4,357,778 | A | 11/1982 | Matsumoto et al. |
| 4,373,693 | A | 2/1983 | Greenberger |
| 4,386,777 | A * | 6/1983 | Prehodka ...................... 104/281 |
| 4,394,961 | A | 7/1983 | Muller |
| 4,426,797 | A | 1/1984 | Burkemper et al. |
| 4,475,303 | A | 10/1984 | Ribas et al. |
| 4,496,100 | A | 1/1985 | Schwager et al. |
| 4,513,966 | A | 4/1985 | Mucaro et al. |
| 4,519,789 | A | 5/1985 | Halford et al. |
| 4,557,064 | A | 12/1985 | Thompson |
| 4,558,867 | A | 12/1985 | Hippely |
| 4,564,197 | A * | 1/1986 | Lambert et al. ................. 463/64 |
| 4,575,350 | A | 3/1986 | Hippely et al. |
| RE32,106 | E | 4/1986 | Lamelson |
| 4,585,166 | A | 4/1986 | Stephens |
| 4,609,363 | A | 9/1986 | Udagawa |
| 4,673,308 | A | 6/1987 | Reilly |
| 4,678,449 | A | 7/1987 | Udagawa |
| 4,708,685 | A | 11/1987 | Udagawa |
| 4,715,843 | A | 12/1987 | Ostendorff et al. |
| 4,795,394 | A | 1/1989 | Thompson |
| 4,874,342 | A | 10/1989 | Klitsner |
| 4,909,464 | A * | 3/1990 | Levine et al. ............ 248/220.22 |
| 4,928,955 | A | 5/1990 | Chaun |
| 4,932,917 | A | 6/1990 | Klitsner |
| 4,951,872 | A | 8/1990 | Sheffield |
| 5,075,515 | A | 12/1991 | Yoneda et al. |
| 5,078,642 | A | 1/1992 | Glessner |
| 5,102,133 | A | 4/1992 | Chilton et al. |
| 5,107,601 | A | 4/1992 | Semchuck |
| 5,161,104 | A | 11/1992 | Fox et al. |
| 5,174,569 | A | 12/1992 | Ngai |
| 5,254,030 | A | 10/1993 | Ostendorff et al. |
| 5,299,969 | A | 4/1994 | Zaruba |
| 5,312,285 | A | 5/1994 | Rieber et al. |
| 5,342,048 | A * | 8/1994 | Jones et al. ..................... 463/62 |
| 5,344,143 | A | 9/1994 | Yule |
| 5,370,571 | A | 12/1994 | Bosch |
| 5,392,987 | A | 2/1995 | Ropers et al. |
| 5,419,066 | A | 5/1995 | Harnois et al. |
| 5,473,833 | A | 12/1995 | Ostrovsky |
| 5,480,115 | A | 1/1996 | Haltof |
| 5,586,923 | A | 12/1996 | Hippely et al. |
| 5,735,724 | A | 4/1998 | Udagawa |
| 5,785,573 | A | 7/1998 | Rothbarth et al. |
| 5,803,782 | A | 9/1998 | Selton |
| 5,846,018 | A * | 12/1998 | Frobosilo et al. .............. 403/403 |

(56) References Cited

U.S. PATENT DOCUMENTS

| | | | |
|---|---|---|---|
| 5,855,501 A | 1/1999 | Kato et al. | |
| 5,899,011 A | 5/1999 | Brinkman | |
| 5,967,052 A * | 10/1999 | Prokopf | 104/126 |
| 6,000,992 A | 12/1999 | Lambert | |
| 6,026,603 A | 2/2000 | Kump et al. | |
| 6,056,620 A * | 5/2000 | Tobin | 446/168 |
| 6,241,573 B1 | 6/2001 | Ostendorff et al. | |
| 6,409,132 B2 * | 6/2002 | Heisler et al. | 248/220.22 |
| 6,439,955 B1 * | 8/2002 | Feketo | 446/444 |
| 6,508,179 B2 | 1/2003 | Annis et al. | |
| 6,640,453 B2 | 11/2003 | Eisenmenger | |
| 6,647,893 B1 | 11/2003 | Fugitt et al. | |
| 6,676,480 B2 | 1/2004 | Sheltman | |
| 6,766,585 B2 | 7/2004 | Thomas | |
| 6,862,997 B2 | 3/2005 | Bussink | |
| 6,951,307 B2 | 10/2005 | Lin | |
| 6,951,497 B1 | 10/2005 | Ngan | |
| 6,951,498 B2 | 10/2005 | Rudell | |
| 6,953,377 B2 | 10/2005 | Quercetti | |
| D511,961 S | 11/2005 | Jordan | |
| 6,976,316 B1 * | 12/2005 | Patterson | 33/392 |
| 7,066,783 B2 | 6/2006 | Fischer | |
| 7,325,348 B2 * | 2/2008 | Mueller et al. | 40/649 |
| 7,353,758 B2 | 4/2008 | Murray | |
| 7,373,731 B2 | 5/2008 | Nyberg | |
| 7,527,156 B2 * | 5/2009 | Wisnoski et al. | 211/70.6 |
| 7,549,906 B2 | 6/2009 | Bedford et al. | |
| 7,600,757 B1 | 10/2009 | Matilla et al. | |
| 7,614,931 B2 | 11/2009 | Nuttall | |
| 7,618,302 B2 | 11/2009 | Collins et al. | |
| 7,628,673 B2 | 12/2009 | Bedford et al. | |
| 7,651,398 B2 | 1/2010 | Ostendorff et al. | |
| 7,690,964 B2 | 4/2010 | Nuttall et al. | |
| 7,708,317 B2 * | 5/2010 | Leblanc | 285/31 |
| 7,766,720 B2 | 8/2010 | Ostendorff | |
| 7,770,811 B2 * | 8/2010 | Belding | 238/10 R |
| 7,857,679 B2 | 12/2010 | O'Connor et al. | |
| 8,162,716 B2 | 4/2012 | Nuttall | |
| 2003/0224697 A1 | 12/2003 | Sheltman et al. | |
| 2004/0078991 A1 | 4/2004 | Thomas | |
| 2005/0287915 A1 | 12/2005 | Sheltman et al. | |
| 2005/0287919 A1 | 12/2005 | Sheltman et al. | |
| 2006/0277779 A1 * | 12/2006 | Bauer | 33/566 |
| 2007/0012636 A1 * | 1/2007 | Wisnoski et al. | 211/70.6 |
| 2007/0049160 A1 | 3/2007 | Matthes et al. | |
| 2007/0128969 A1 * | 6/2007 | Shrock et al. | 446/153 |
| 2007/0209543 A1 | 9/2007 | Beaulieu et al. | |
| 2008/0064295 A1 | 3/2008 | Abrams | |
| 2008/0268743 A1 * | 10/2008 | O'Connor et al. | 446/429 |
| 2009/0075558 A1 | 3/2009 | Ostendorff | |
| 2010/0056015 A1 * | 3/2010 | Nuttall | 446/174 |
| 2010/0112896 A1 * | 5/2010 | Chang et al. | 446/429 |
| 2010/0184353 A1 | 7/2010 | Jobe | |
| 2010/0199598 A1 * | 8/2010 | Townsend et al. | 52/745.21 |
| 2010/0273394 A1 | 10/2010 | O'Connor et al. | |
| 2011/0086574 A1 | 4/2011 | Nuttall et al. | |
| 2011/0269372 A1 | 11/2011 | Nuttall | |
| 2012/0052766 A1 | 3/2012 | Payne | |
| 2012/0164914 A1 * | 6/2012 | O'Connor et al. | 446/444 |

OTHER PUBLICATIONS

Written Opinion dated Apr. 9, 2012 for International Application No. PCT/US2011/049587.

* cited by examiner

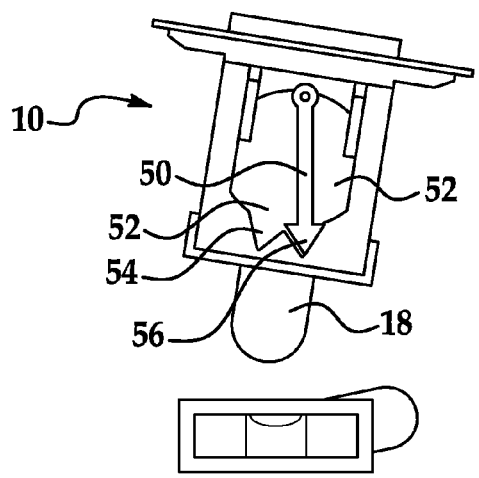 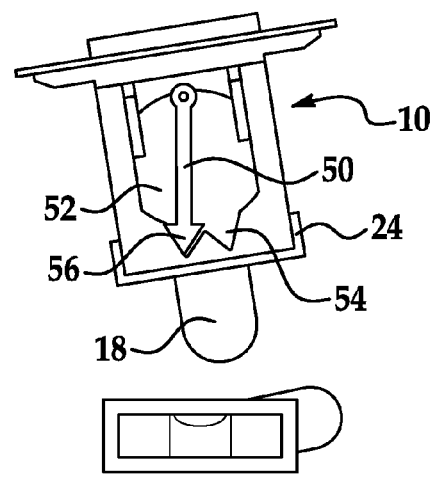
FIG. 1A  FIG. 1B
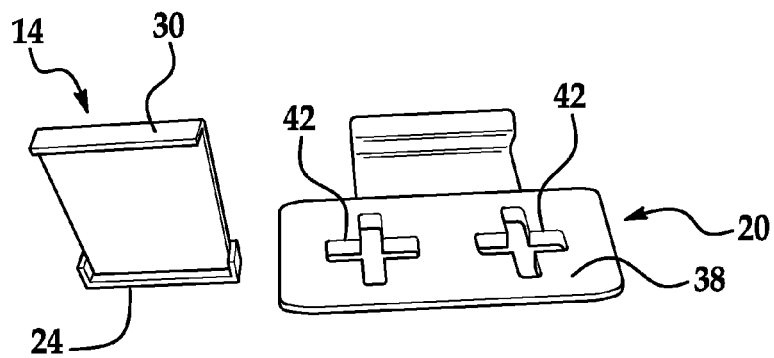
FIG. 1C
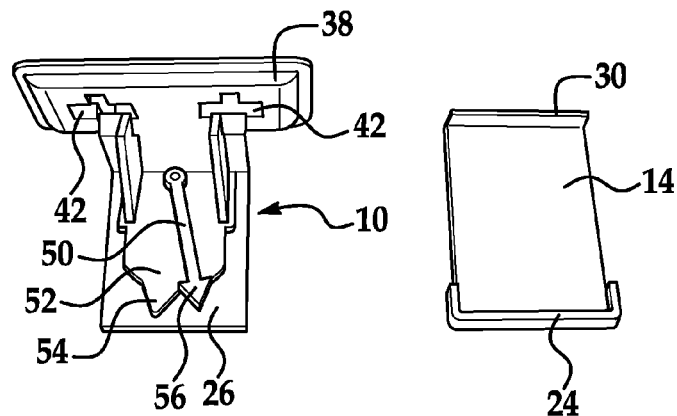
FIG. 1D

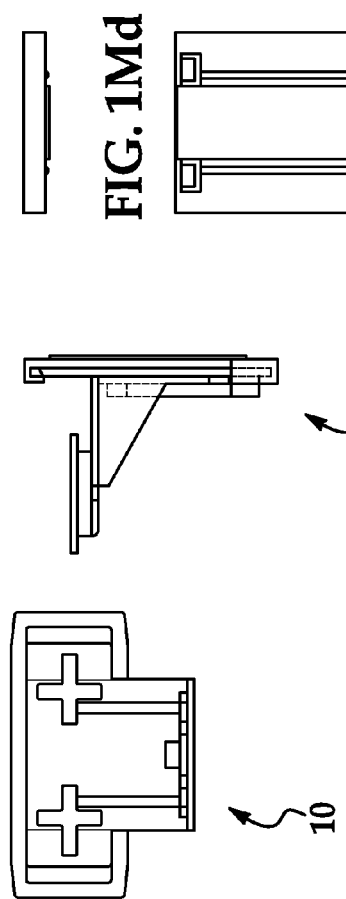
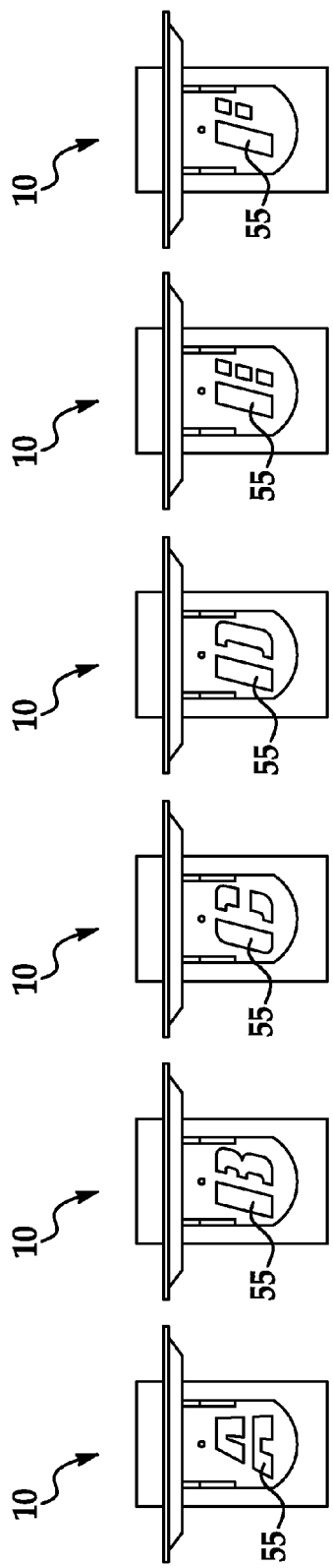

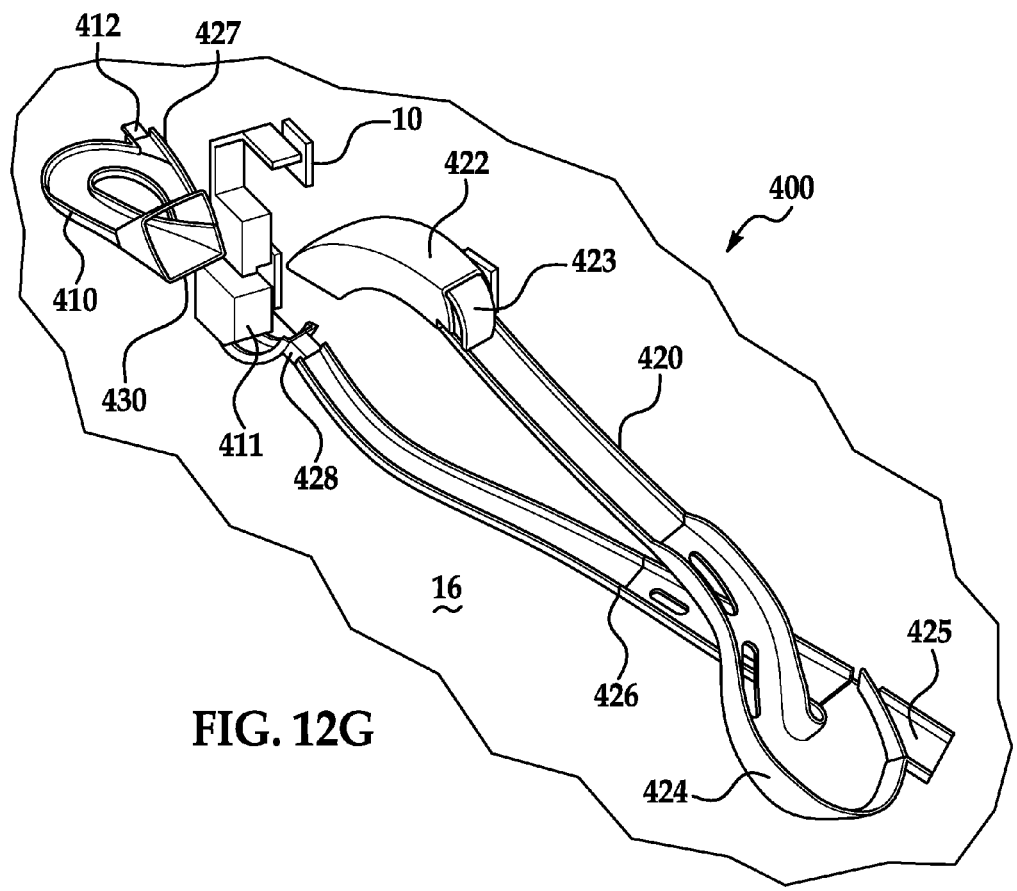
FIG. 12G
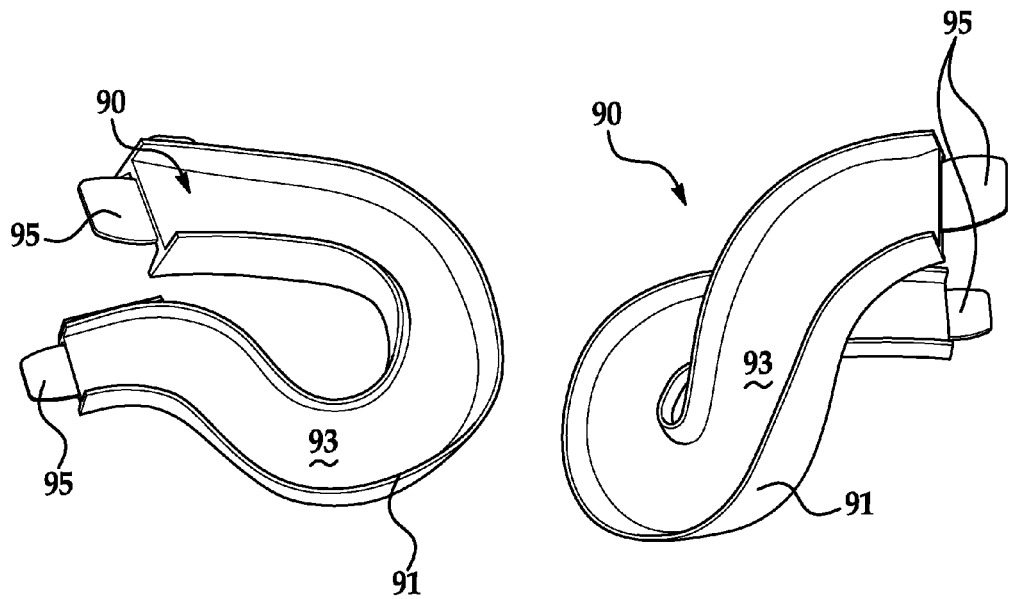
FIG. 13A
FIG. 13B

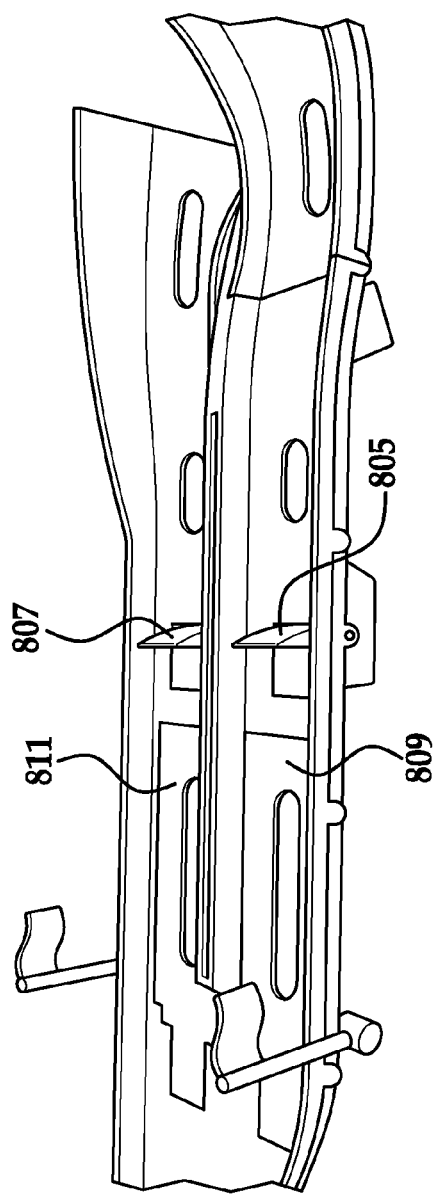
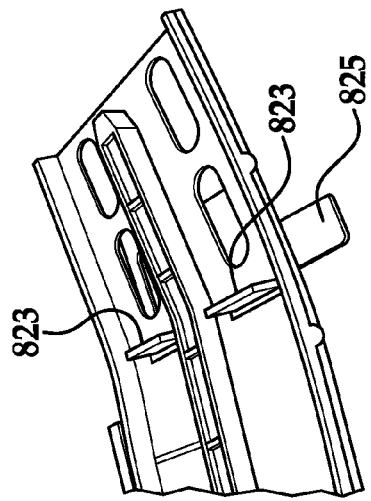
FIG. 18B
FIG. 18C

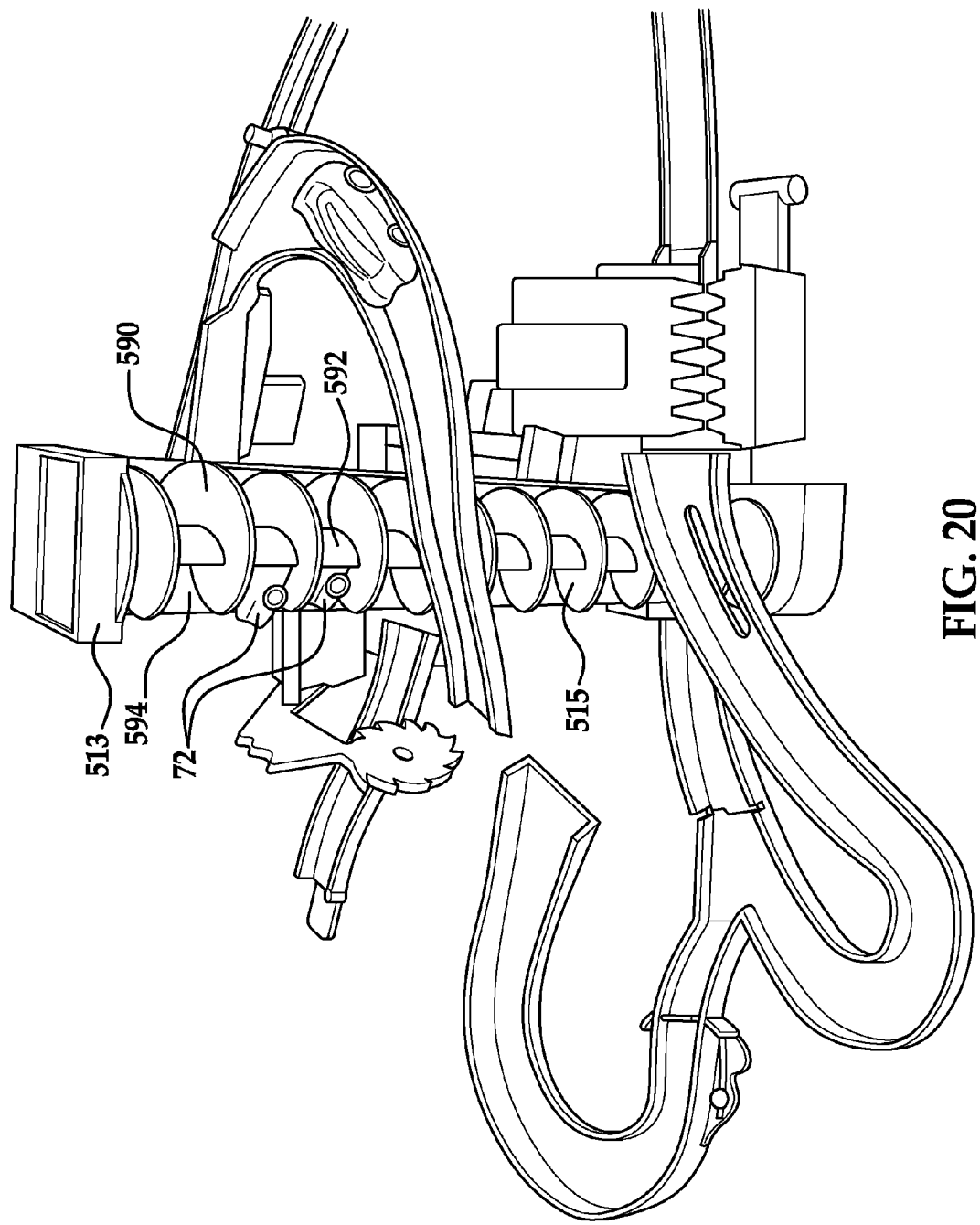

WALL MOUNTED TOY TRACK SET

CROSS REFERENCE TO RELATED APPLICATIONS

This application claims the benefit of the following U.S. Provisional Patent Application Ser. Nos. 61/377,743 and filed on Aug. 27, 2010 and 61/480,793 filed on Apr. 29, 2011, the contents each of which are incorporated herein by reference thereto.

BACKGROUND

Various embodiments of the present invention are related to toys in particular, a track set for toy vehicles to travel on.

Toy vehicle track sets have been popular for many years and generally include one or more track sections arranged to form a path around which one or more toy vehicles can travel. Toy vehicles which may be used on such track sets may be either self-powered vehicles or may receive power from an external source.

Accordingly, it is desirable to provide toy track set with features that provide unique paths for the toy vehicles of the toy track to travel on.

SUMMARY OF THE INVENTION

In one embodiment, a wall mount for a track set is provided, the wall mount having: a planar member; a mount member configured to be snap fittingly engaged into the planar member; wherein the mount member is configured to releasably engage a front surface of the planar member and wherein the front surface of planar member further comprises a ledge portion that is configured to engage a bottom portion of the mount member and a feature that is configured to engage an upper portion of the mount member.

In another embodiment, a toy track set is provided herein, the toy track set having: a plurality of wall mounts, each of the plurality of wall mounts having: a planar member; a mount member configured to be snap fittingly engaged into the planar member; wherein the mount member is configured to releasably engage a front surface of the planar member and wherein the front surface of planar member further comprises a ledge portion that is configured to engage a bottom portion of the mount member and a feature that is configured to engage an upper portion of the mount member, wherein the mount member further comprises a vertical wall portion and a horizontal mounting portion extending therefrom, the horizontal mounting portion having a uniquely shaped aperture configured to receive and engage a complimentary uniquely shaped feature secured to a bottom surface of a track segment; a first track segment configured to engage at least one of the plurality of wall mounts and direct an object in a first direction generally down the first track segment; and a U-turn device configured to receive the object from the first track segment and redirect the object it in a direction substantially opposite to the first direction down a second track segment, wherein the second track segment is also configured to engage at least another one of the plurality of wall mounts.

BRIEF DESCRIPTION OF THE DRAWINGS

FIGS. 13A-14B are views illustrating a reversible curves contemplated for use with exemplary embodiments of the present invention;

FIGS. 18A-18C are views illustrating yet another track set according to another alternative exemplary embodiment of the present invention;

FIG. 20 is a perspective view of a track set according to yet another alternative exemplary embodiment of the present invention.

DETAILED DESCRIPTION

Figure 1E:
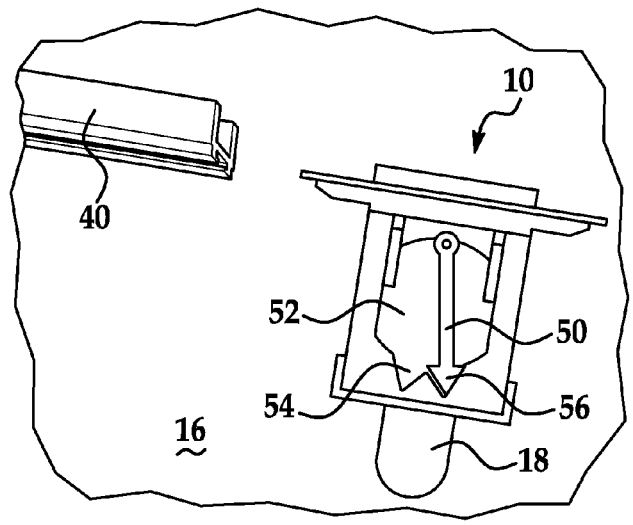
FIGS. 1A-1P illustrate various exemplary embodiments of the present invention.
Figure 1F:
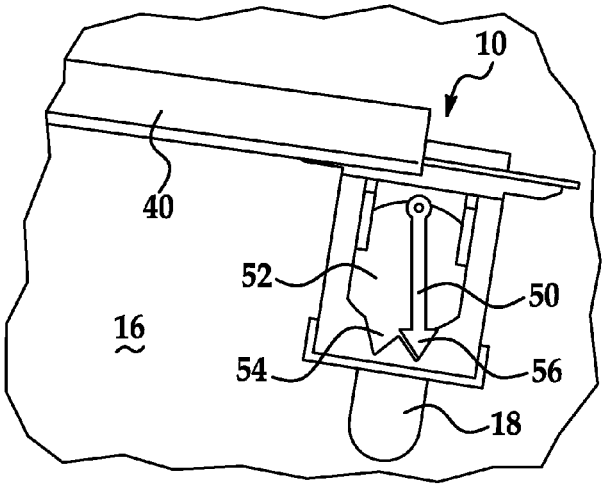
Figure 1G:
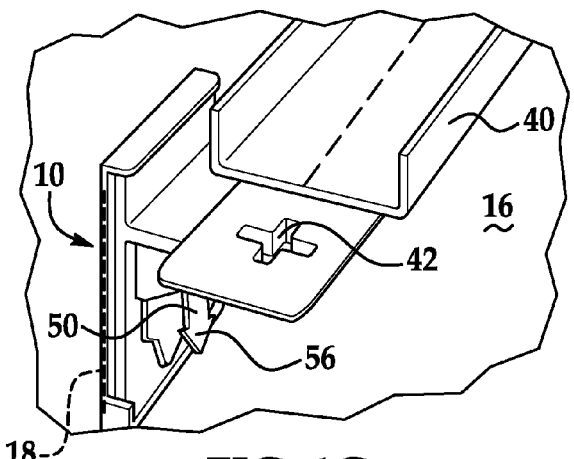
Figure 1H:
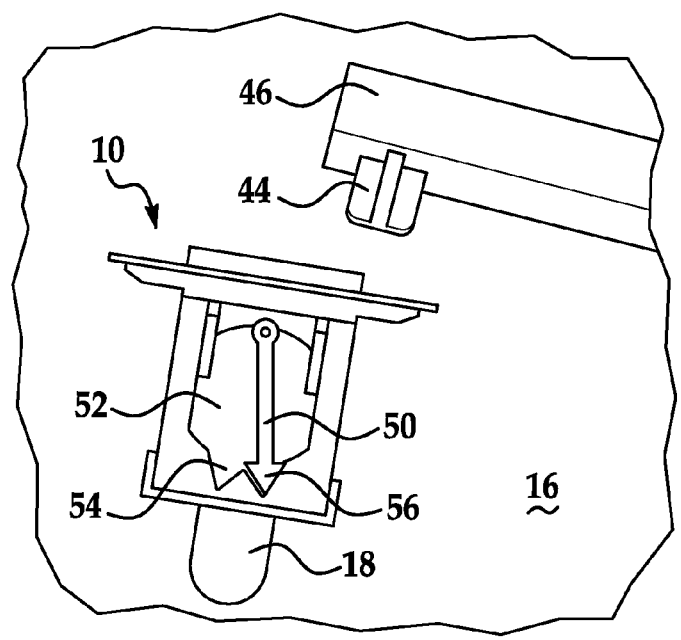
Figure 1I:
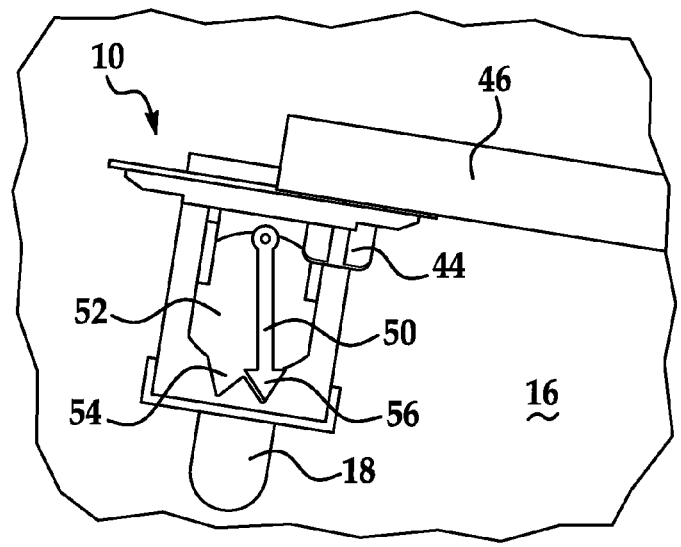
Figure 1J:
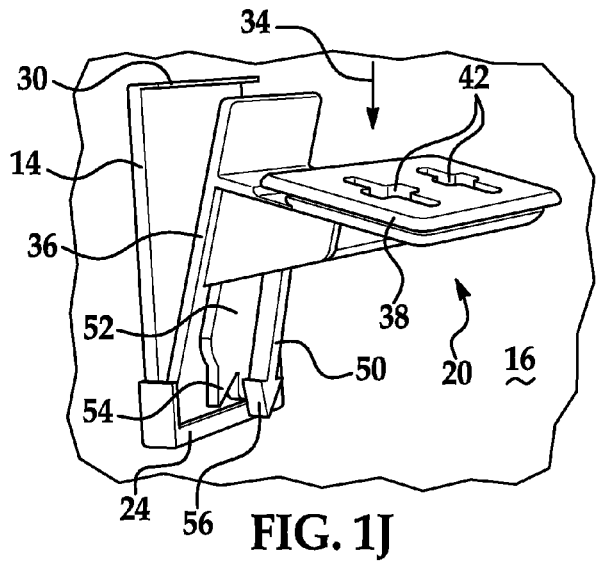
Figure 1K:
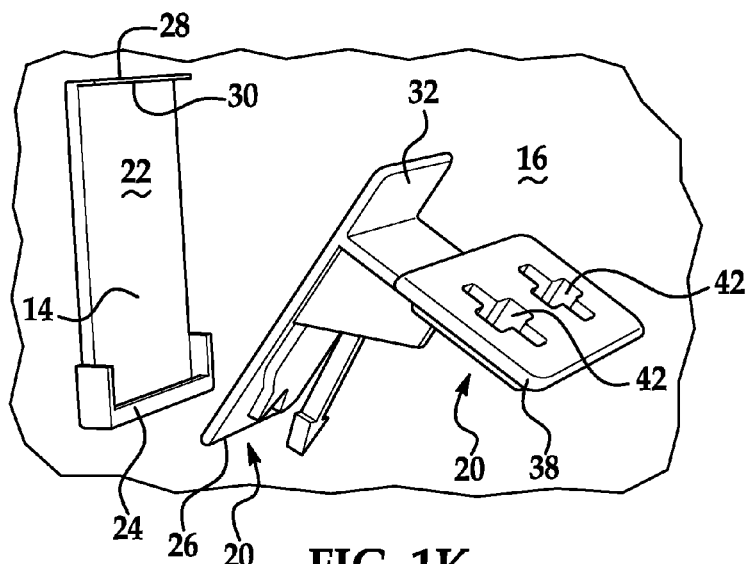
Figure 1L:
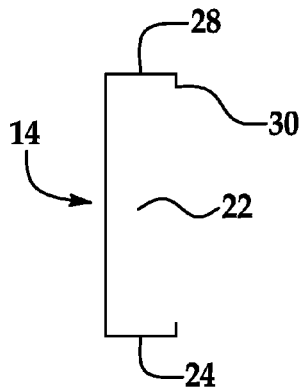

Referring now to FIGS. 1A-1L a wall mount 10 for a track set 12 in accordance with an exemplary embodiment of the present invention is illustrated. Wall mount 10 has a planar member 14 that is secured to a wall 16 via removable double-sided adhesive tape 18 or other equivalent material. One non-limiting example of such adhesive tape it is commercially available from 3M sold under the trademark COMMAND STRIP. Of course, any other removable adhesive material may be utilized to secure planar member 14 to wall 16. Wall mount 10 further comprises a mount member 20 that is configured to releasably engage a front surface 22 of planar member 14. Front surface 22 of planar member 14 further comprises a ledge portion 24 that is configured to engage a bottom portion 26 of the mount member 20. The front surface 22 of the planar member of further comprises a top ledge 28 that has a hook or feature 30 that is configured to engage and upper portion 32 of the mount member 20. In various embodiments disclosed herein the feature may frictionally engage the upper portion of the mount member. Still further the feature may comprise any type of releasable mechanical fasteners or equivalents thereof. Non-limiting embodiments of feature 30 includes, hooks, hook and loop fasteners, magnets, equivalents thereof and combinations thereof.

Accordingly and in order to secure mount member 20 to planar member 14 a user simply places the bottom portion 26 on ledge portion 24 and then move the upper portion 32 towards feature 30 of planar member 14. Once in this position the mount member is secured to the planar member, which in turn is secured to the wall via the removable adhesive. Accordingly, through the use of a removable adhesive planar member 14 can be secured to the wall in a variety of locations which will provide for numerous track configurations as will be discussed herein.

In addition, the releasable securement of mount member 20 to planar member 14 also provides for a breakaway feature wherein excessive forces in the direction of the arrow 34 will cause mount member 20 two become disengaged from the planar member prior to the planar member being torn away from the wall such that damage to the wall will be prevented. Accordingly, this wall mount will provide a user with a mechanism that can be releasably secured to various locations upon a wall without damaging the same.

Still further, mount member 20 further comprises a vertical wall portion 36 and a horizontal mounting portion 38 extending therefrom. In one embodiment, vertical wall portion 36 comprises bottom portion 26 and upper portion 32. As will be discussed herein, horizontal mounting portion 38 provides a means for securing track segments to the mount member 20. Although described as a horizontal mounting portion, portion 38 does not necessarily have to be positioned in a horizontal manner once mount member 20 is secured to planar member 14 since planar member 14 itself may be secured to the wall in an angular configuration.

In one application the configuration (e.g., width and height of the horizontal mounting portion) allows for a track segment 40 to be slidably secured to the horizontal mounting portion. In addition, the horizontal mounting portion is configured to have a uniquely shaped aperture 42 that is configured to receive a complimentary uniquely shaped feature 44 secured to a bottom surface of a track segment 46. In one non-limiting exemplary embodiment, aperture 42 and feature 44 are configured to have a cross or plus (+) shape configuration. Of course, any other suitable configuration is considered to be within the scope of exemplary embodiments of the present invention and the same is not limited to the specific configurations illustrated herein. Since wall mount 10 will be used for mounting tracks to a vertical surface such as wall 16 feature 44 is particularly useful in that the track segment must be pushed down vertically in order to engage the aperture and the horizontal mounting portion and the feature by virtue of its extending from a bottom surface of the track will prevent the track itself from sliding off of the horizontal mounting surface due to horizontal or angular movement of the track with respect to the horizontal mounting surface.

Mount member 20 further comprises a plumb bob indicator 50 that is pivotally mounted to the mount member. Plumb bob indicator 50 is positioned over an integrally molded feature 52 that includes an arrow portion 54 which corresponds to a vertical orientation of the mount member. Accordingly and since the plumb bob indicator is pivotally mounted to the mount member when the mount member is mounted to a surface in an angular configuration (e.g., other than vertical or 90° with respect to a horizontal line) the plumb bob indicator will be offset from feature 52 and in particular arrow portion 54. A free end 56 of the plumb bob indicator will be configured to have an arrow portion such that when the free end is offset from arrow portion 54 the arrow portion of the free end of the plumb bob indicator will provide a means for indicating whether it be mount member has been secured to the wall with an inclination to either the right or left.

As will be illustrated herein a plurality of mount members will be used to secure track segments to a wall in a variety of configurations such that toy vehicles traveling thereon will be able to traverse the track segments. In order to achieve this the track segments will have to be mounted to the wall in an angular fashion such that gravity will be able to pull objects or toy vehicles down the track segments. By locating a plumb bob indicator on the mount member a quick and convenient means for determining whether the mount member has been releasably secured to the wall with an angular inclination to either the right or the left will be provided.

Accordingly, a standalone mounting system for mounting a plurality of track segments to a wall is provided. In one embodiment the mounting system comprises a plurality of wall mounts as described above. Still further in at least one of the wall mounts or all of them or a portion of them will include a plumb-bob indicator showing the appropriate angle of the track secured to the mounting system. In addition, the mounting system will include a bracket and track connector wherein the system will have a breakaway feature that allows the track connector to be removed (intentionally or inadvertently) from the bracket secured to the wall upon the application of a predetermined amount of force. For example, a lip feature at the top of the bracket is configured to retain a top portion of the track connector while a bottom portion of the track connector is seated on a ledge or lip of the bracket. This feature will limit inadvertent damage to walls and also allows the track connector to be removed and replaced without completely removing the underlying attachment member of the bracket, which in one embodiment is any suitable fastener such as double sided adhesive tape.

Figure 2A:
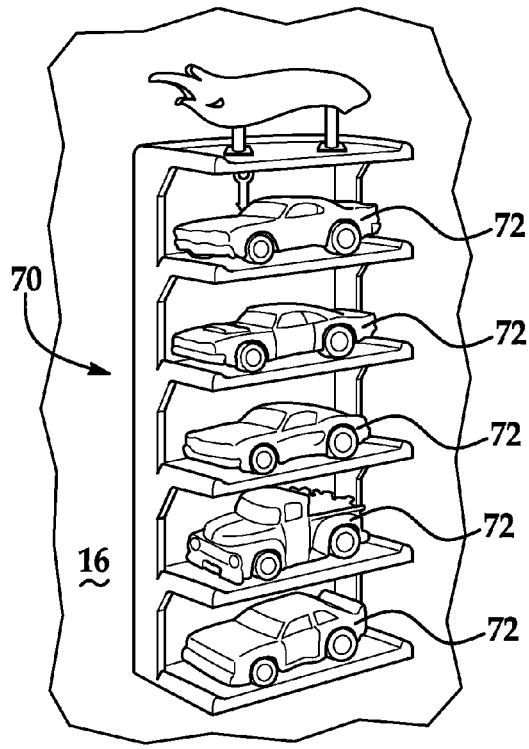
FIGS. 2A-2E are perspective cross-sectional views of a storage rack and mechanism for mounting the same to a wall.
Figure 2B:
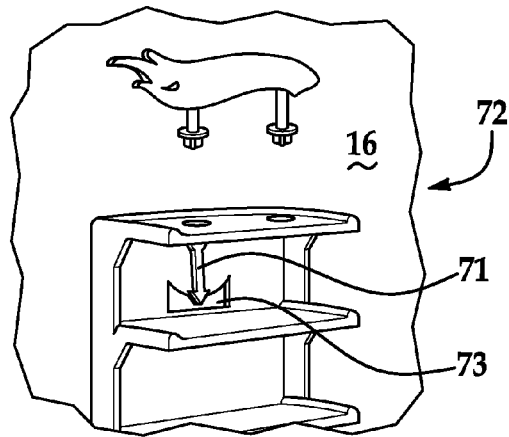
Figure 2C:
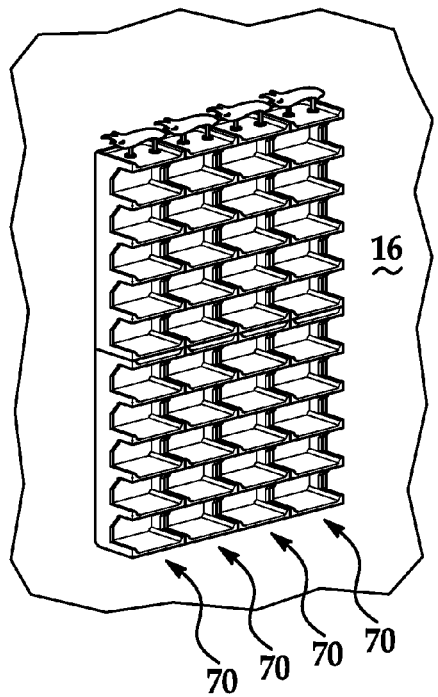

Referring back to FIG. 2A-2C a storage rack 70 for use with a plurality of toy vehicles 72 is illustrated. Similar to the wall mount a storage rack 70 may be secured to the wall 16 via a double-sided removable adhesive tape. In addition and in one non-limiting embodiment, the storage rack is mounted to the wall via a wall mount 10 or plurality of wall mounts 10 previously disclosed herein. Here the wall mounts will also provide a breakaway feature that allows the storage rack to be removed (intentionally or inadvertently) from the bracket or brackets of the wall mounts secured to the wall upon the application of a predetermined amount of force. In addition, storage rack 70 may also include a plumb bob indicator 71 and appropriately configured features 73 that allows for proper plumbing of the storage rack as it is secured to the wall. In this embodiment, it is desirable to secure the storage rack to the wall in a plumb manner such that the toy vehicles will not roll off the platforms of the storage rack. FIG. 2C illustrates a plurality of storage racks 70 secured next to each other on wall 16. Thus and as a user increases their collection as additional storage racks maybe applied to the wall to accommodate additional vehicles 72.

Figure 2D:
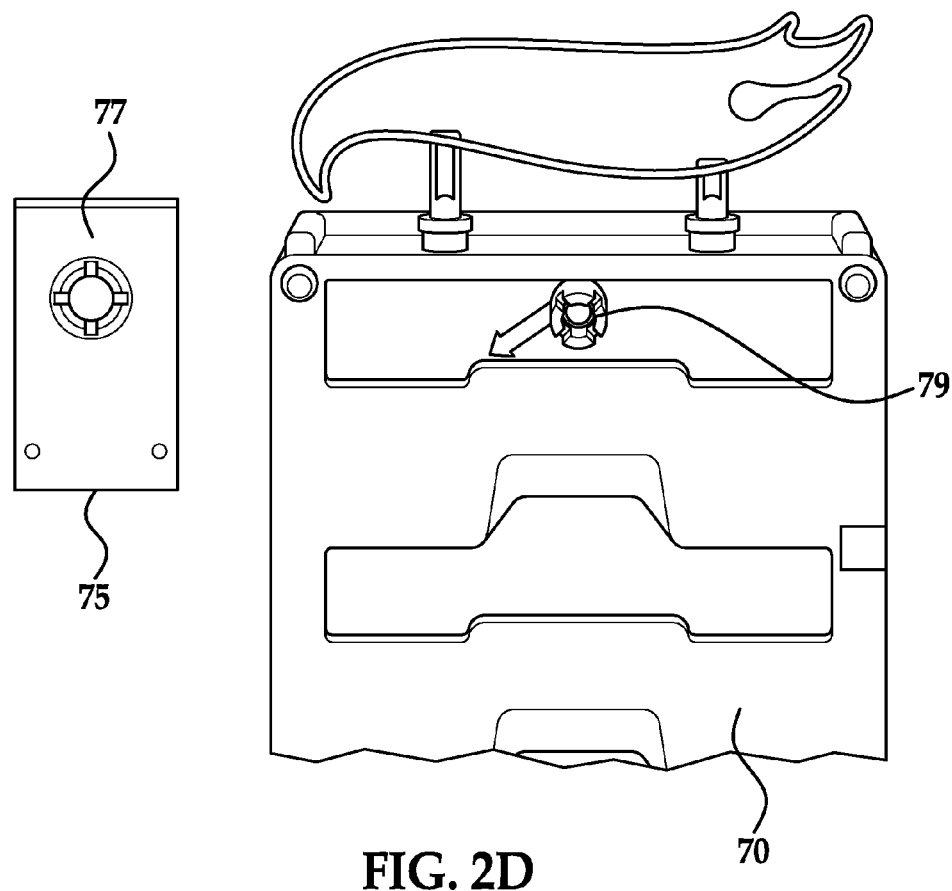
Figure 2E:
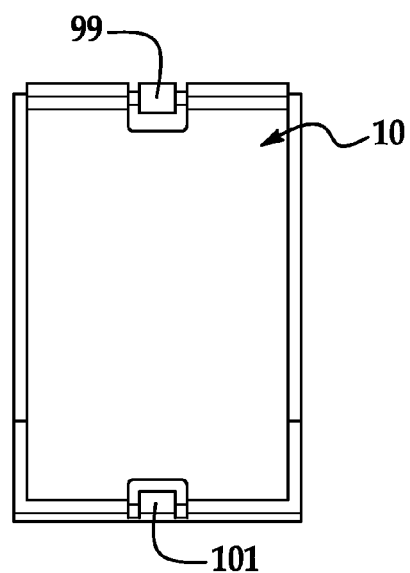

Still further and referring now to FIGS. 2D-2E an alternative mounting mechanism 75 for mounting the storage rack 70 to the wall via mounting member 10 is illustrated. Here, the mounting mechanism 75 comprises a planar member configured to be releasably engaged tab features 99 and 101 of a wall mount 10 thus securing the mounting mechanism 75 to the wall mount via a first mounting interface. Then a second mounting interface between the storage rack 70 and mounting mechanism 75 is provided wherein features 77 of the mounting mechanism 75 are configured to releasably engage complimentary features 79 of the storage rack 70 in a snap-fit or friction fit engagement such that the storage rack 70 can releasably engage mounting mechanism 75 which releasably engages wall mount 10.

In one non-limiting exemplary embodiment, features 77 are a plurality of resilient tabs depending away from a surface of the mounting mechanism 75 with gaps disposed therebetween such that the tabs can deflect outward to receive features 79 therein and then deflect inwards back to an original position when features 79 are received within features 77 thus securing mechanism 75 to storage rack 70. In order to disengage the mechanism 75 from storage rack 70 a force is applied to storage rack 70 in order to deflect the tabs outward so features 79 can be removed and once removed the tabs return back to the original position.

Figure 1O:
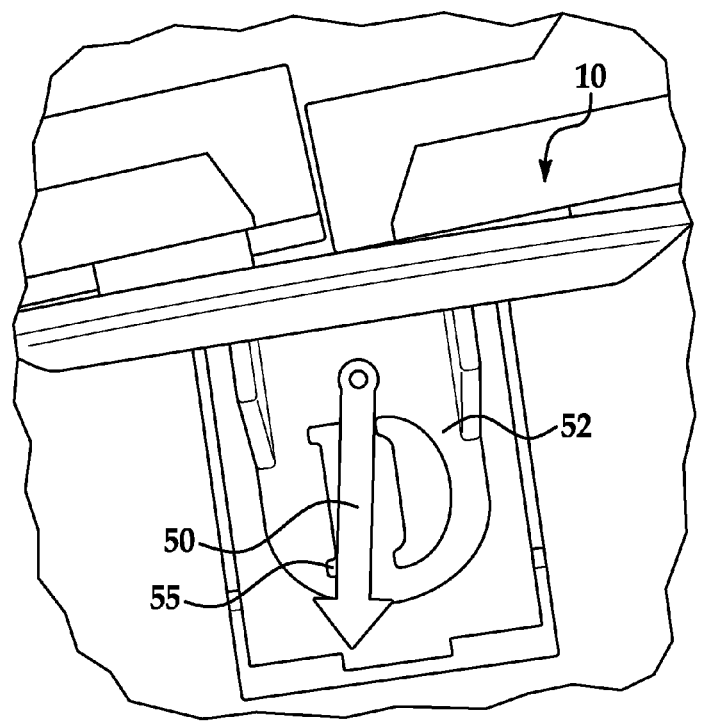
Figure 1P:
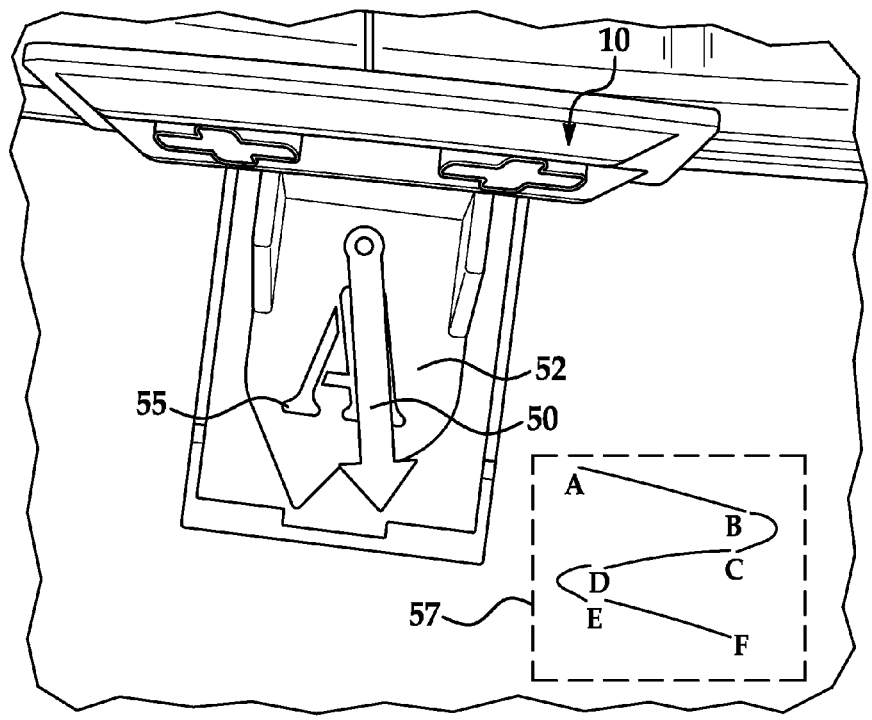

Referring now to FIGS. 1M-1P alternative embodiments of wall mounts 10 are illustrated. Here feature 52 may be configured to have two arrow portions 54 or alternatively a single arrow portion which is located on either the right or left of the plumb bob indicator wherein the location of the arrow portion provides the correct location of the plumb bob indicator for a specific wall mount for use in a specific track set. For example, FIG. 1O or 1P illustrate the plumb bob being aligned with feature 52 and arrow. In another embodiment, each of the wall mounts has indicia 55 either applied or integral to the wall mount, which may assist in the location sequence of the wall mounts (e.g., A, B, C, . . . or 1, 2, 3, 4 . . . ). For example, see the installation sequence 57 showing the location of the wall mounts via the use of letters. This sequence may also be printed on a paper template mounting system 120. Although dimensions are illustrated in the attached drawings it is understood that any dimensions listed are examples and exemplary embodiments of the present invention are not limited to the specific dimensions disclosed herein.

Referring now to FIGS. 3-6 various track sets in accordance with exemplary embodiments of the present invention are illustrated. As will be illustrated, the track sets will provide a track path with variety of options wherein vehicles or objects placed on the track path will move in both a horizontal and vertical manner and in some instances in a left to right and right to left manner as the vehicle or object also moves downwardly. Still further the track sets will utilize the aforementioned wall mounts wherein a plurality of sidewall tracks are mounted perpendicular to a vertical wall and in some instances joined by a u-turn member or device. As will be discussed herein, the U-turn device may include numerous configurations namely, a reversal device (180 degree turn); a flipping device (360 rotation about a toy vehicle axis); and a combination flipping/reversal device. Other iterations include track diverters, collapsible bridges, jumps and other stunts included in the track path.

Figure 3:
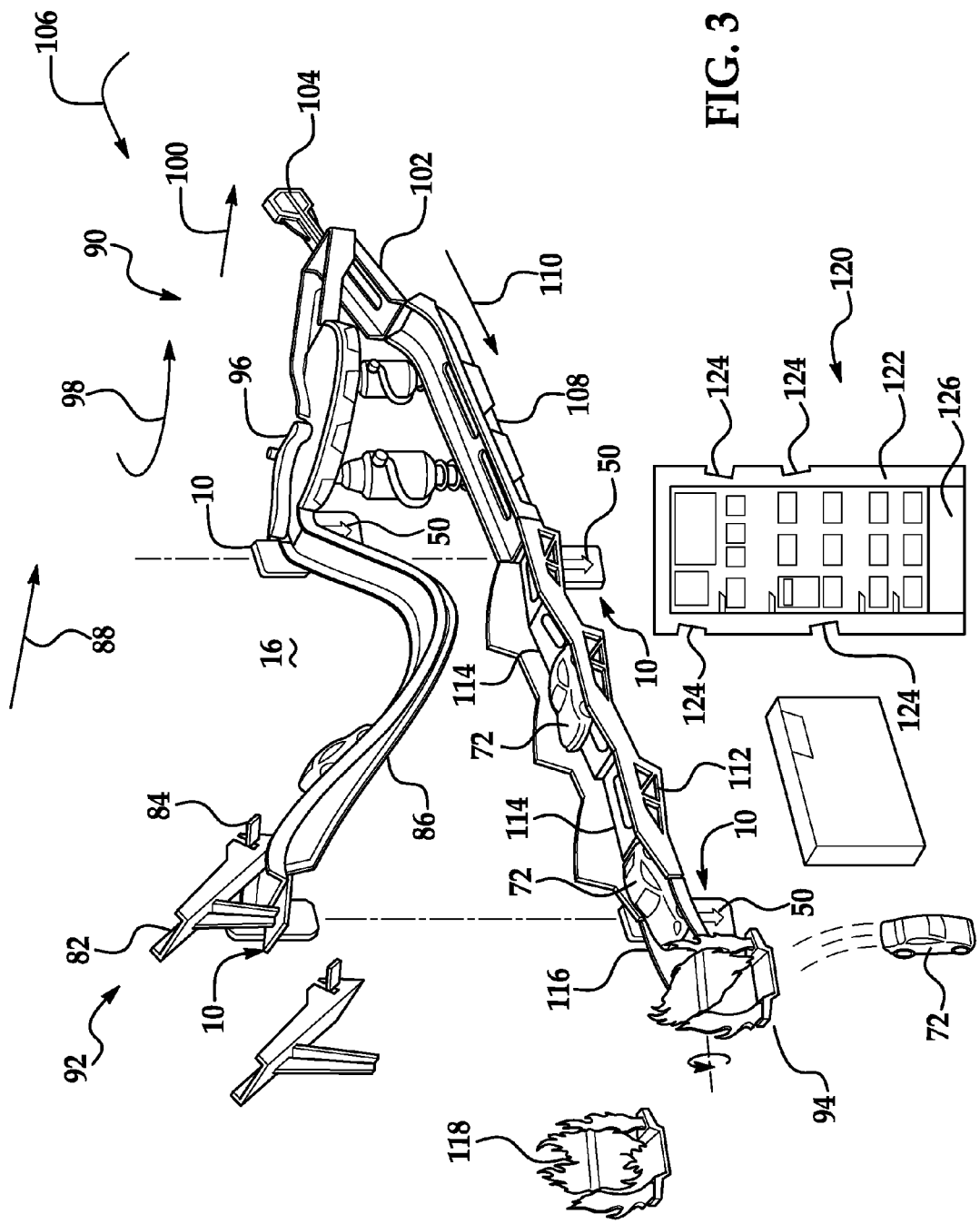
FIG. 3 is a perspective view of track set in accordance with an exemplary embodiment of the present invention.

Referring now to at least FIG. 3 a wall mounted track set 80 is illustrated. In this embodiment four wall mounts 10 are utilized for securing the track set 80 to wall 16. Of course, the number of wall mounts may increase or decrease depending on the configuration of the tracks being mounted to the wall. As discussed above some or all of the wall mounts may have a plumb bob indicator 50. Here track set 80 has a start platform 82 with a gate 84 for releasing a toy vehicle 72 down track set 80. Once released and due to gravity the toy vehicle will traverse down a first track segment 86 in a first direction generally and the direction of arrow 88. Then the vehicle will encounter a U-turn device 90 that will receive the toy vehicle and redirect it in a direction substantially opposite to that of arrow 88 while also continuing to traverse downwardly from a start position 92 of the track set to an end position 94 of the track set. In this embodiment, the U-turn device includes a spring bias to lever 96 that rotates the toy vehicle approximately 180° in the direction of the arrow 98 and then the vehicle travels in the direction of arrow 100 into a pivotally mounted drop member 102 that has a counterweight 104 such that when drop member 102 is empty a surface of the drop member is positioned to receive the toy vehicle from the lever 96 and then the weight of the toy vehicle causes the drop member to rotate in the direction of the arrow 106 such that the vehicle can travel on to another track segment 108 in the direction of arrow 110. At this point the toy vehicle is now traveling in a direction substantially opposite to arrow 88 while still traveling downwardly towards end position 94. Adjacent to track segment 108 is another track segment 112 that is configured to have a plurality of up and down features 114. In this embodiment, vehicles may be positioned on the upward slopes of the up down features and the same are configured such that a bump-and-go track segment is provided with a plurality of receiving areas, each of which can hold a single toy vehicle or object and the impact of one object coming down the track will push each toy vehicle or object into the next one down the line or off the track segment. Track segment 112 terminates with a rotating end member 116 through which the toy vehicle 72 passes through. In this embodiment the end member when 16 has a rotatable member 118 that is configured to resemble flames. Of course, any other configuration is contemplated to be within the scope of exemplary embodiments of the present invention.

Also contemplated is a paper-template mounting system 120, wherein a paper template 122 can be placed on the wall and shows precisely where each mounting piece or wall mount should be placed on the wall via cutouts 124 positioned on the sides or periphery of the paper template. The template will have a bottom portion 126 that is lined up with a user's floor and each of the cutouts 124 are angularly configured to position the wall mounts 10 therein. Accordingly the angular configuration of the wall mounts and their distance (vertical and horizontal) is provided such that specific track configurations of certain lengths may be easily secured to each other and the wall mounts. Still further, the template can also have indicia 121 and instruction printed on a face 123 of the template.

Figure 4:
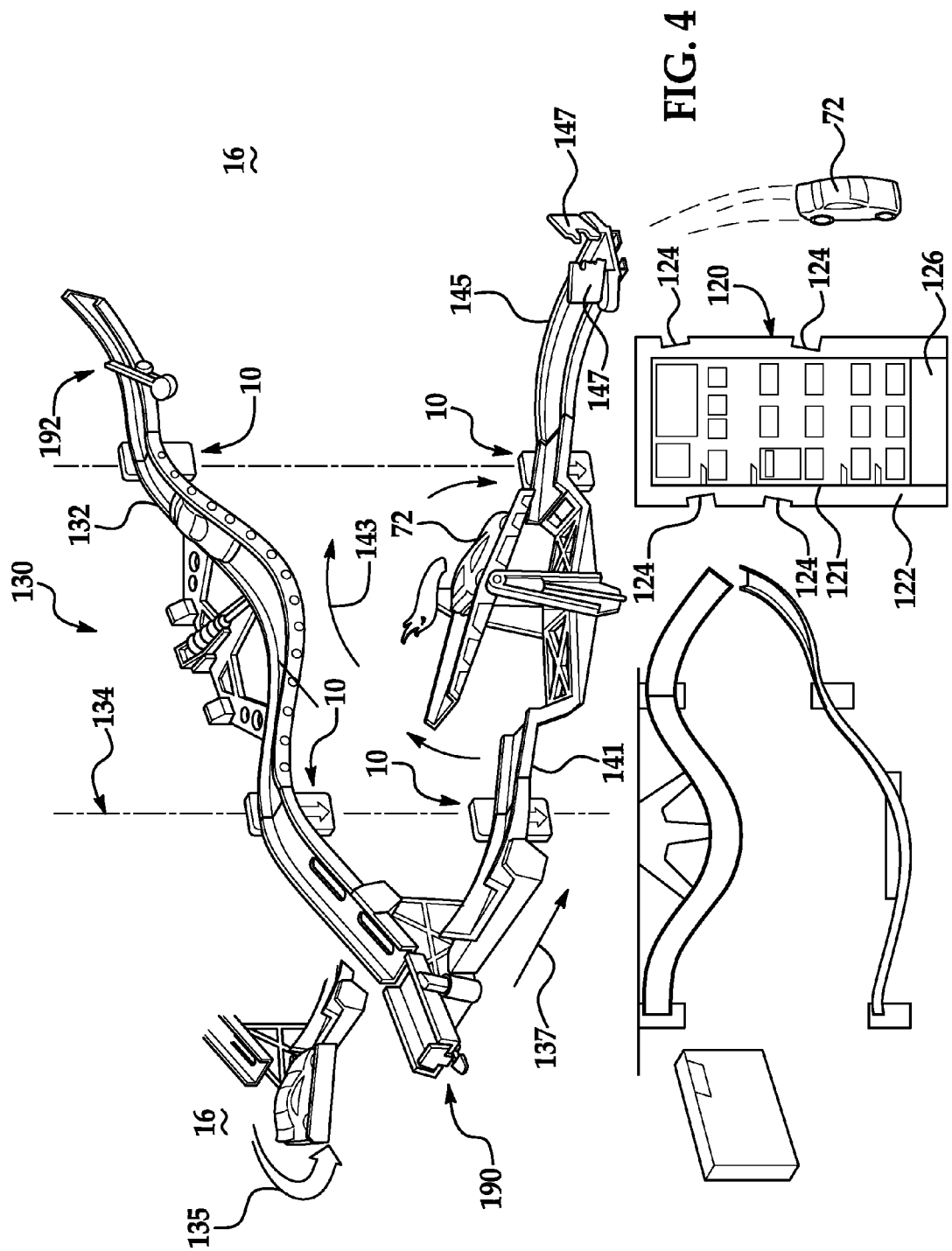
FIG. 4 is a perspective view of track set in accordance with another exemplary embodiment of the present invention.

Referring now to at least FIG. 4 another wall mounted track set 130 is illustrated. In this embodiment four wall mounts 10 are utilized for securing the track set 130 to wall 16. Of course, the number of wall mounts may increase or decrease depending on the configuration of the tracks being mounted to the wall. As discussed above some or all of the wall mounts may have a plumb bob indicator 50. Here the toy vehicles travel down a first track segment 132 in a first direction generally and in the direction of arrow 134. Then the vehicle will encounter a U-turn device 190 that will receive the toy vehicle and redirect it in a direction substantially opposite to that of arrow 134 while also continuing to traverse downwardly from a start position 192 of the track set to an end position 194 of the track set. In this embodiment, the U-turn device includes a swing platform that is configured to receive and rotate the toy vehicle in the direction of arrow 135. Here the toy vehicle rotates approximately 180° in the direction of the arrow 135 and then the vehicle travels in the direction of arrow 137 into a pivotally mounted see saw track member 139 that is configured to be in a position to receive the toy vehicle from a track segment 141 and then rotate in the direction of arrows 143 such that the toy vehicle is then dropped off into a track segment 145 wherein the vehicle crashes through breakthrough wall portions 147 pivotally mounted to an end portion of track 145.

As in the previous embodiment, a paper-template mounting system 120 is provided, wherein a paper template 122 can be placed on the wall, and shows precisely where each mounting piece or wall mount should be placed on the wall via cutouts 124 positioned on the sides of the paper template. The template will have a bottom portion 126 that is lined up with a user's floor and each of the cutouts 124 are angularly configured to position the wall mounts 10 therein. Accordingly the angular configuration of the wall mounts and their distance (vertical and horizontal) is provided such that specific track configurations of certain lengths may be easily secured to each other and the wall mounts.

Figure 5:
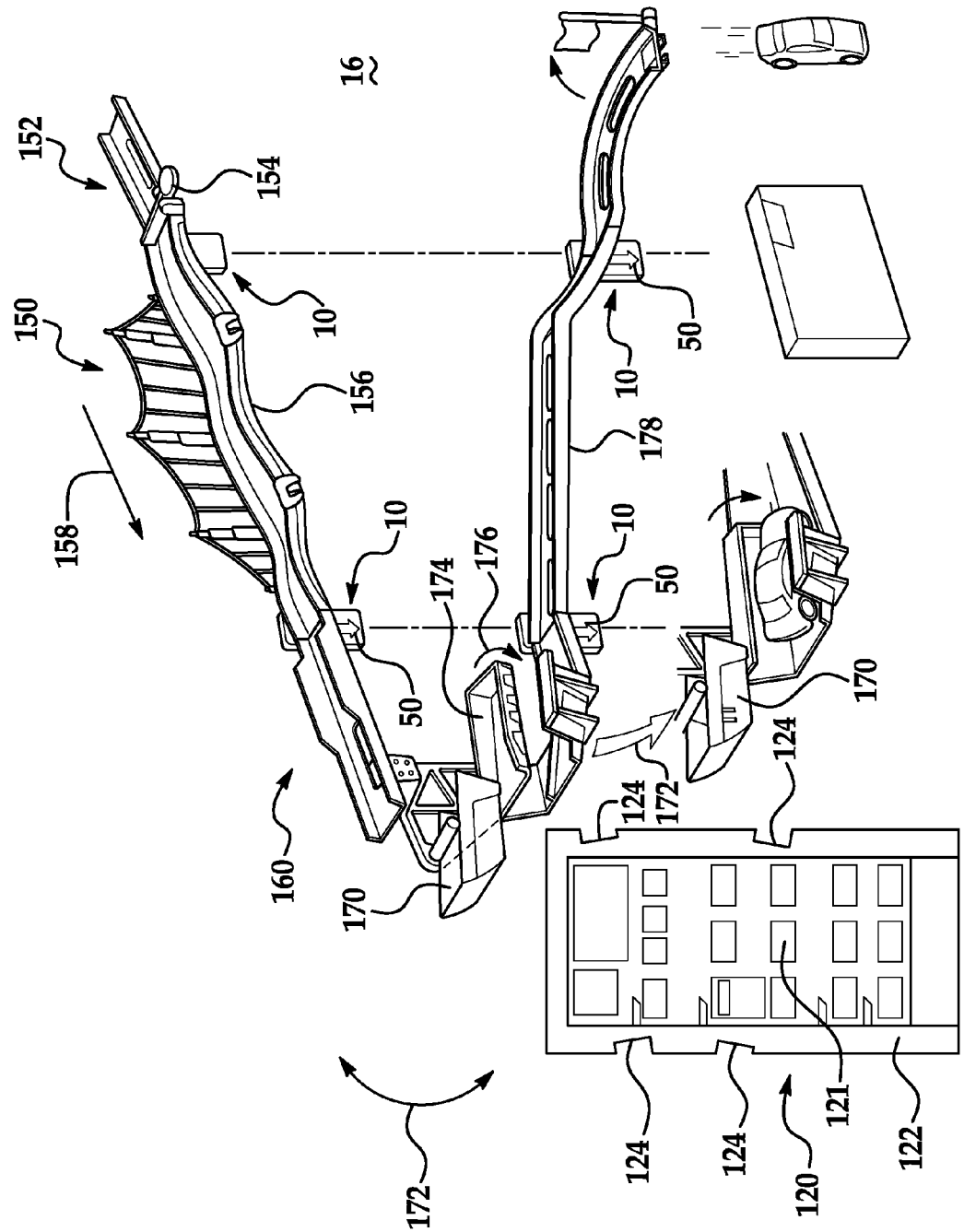
FIG. 5 is a perspective view of track set in accordance with yet another exemplary embodiment of the present invention.
Figure 5A:
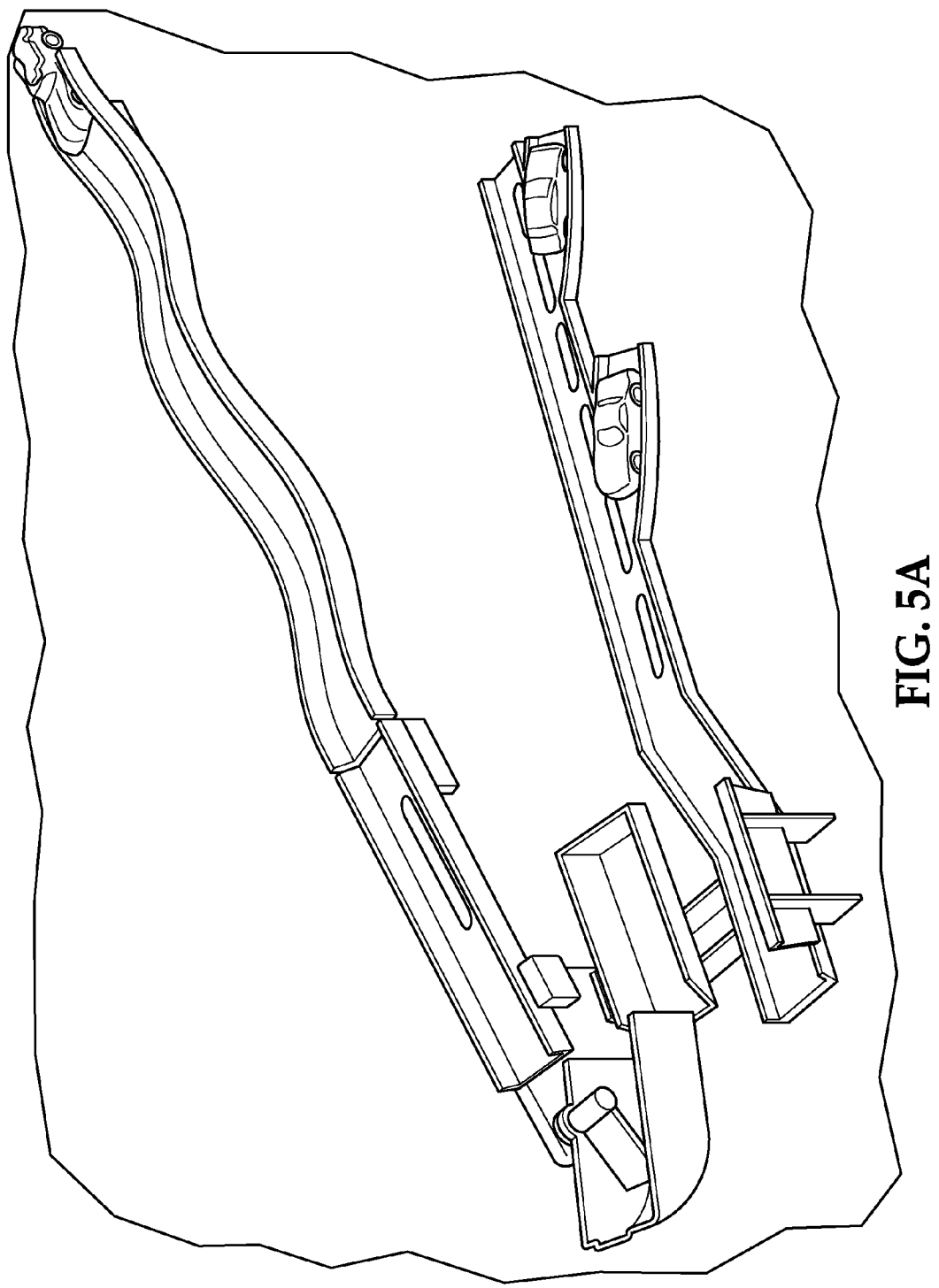

Referring now to at least FIG. 5 another wall mounted track set 150 is illustrated. Once again and similar to the previous embodiments, four wall mounts 10 are utilized for securing the track set 150 to wall 16. Of course, the number of wall mounts may increase or decrease depending on the configuration of the tracks being mounted to the wall. As discussed above some or all of the wall mounts may have a plumb bob indicator 50. In this embodiment, the track set has an upper start portion 152 with a movable gate 154 pivotally mounted to a first track segment 156. Here the toy vehicles travel down the first track segment in a first direction generally in the direction of arrow 158. Then the vehicle will encounter a U-turn device 160 that will receive the toy vehicle and redirect it in a direction substantially opposite to that of arrow 158 while also continuing to traverse downwardly from the start position of the track set to an end position of the track set. In this embodiment, the U-turn device includes a first swing platform 170 that is configured to receive and rotate the toy vehicle in the direction of arrow 172 and then deposit the toy vehicle into a second swing platform 174 configured to receive and rotate the toy vehicle in the direction of arrow 176 while depositing the same onto another track member 178 that directs the toy vehicle towards an end of the track set.

As in the previous embodiment, a paper-template mounting system 120 is provided, wherein a paper template 122 can be placed on the wall, and shows precisely where each mounting piece or wall mount should be placed on the wall via cutouts 124 positioned on the sides of the paper template. The template will have a bottom portion 126 that is lined up with a user's floor and each of the cutouts 124 are angularly configured to position the wall mounts 10 therein. Accordingly the angular configuration of the wall mounts and their distance (vertical and horizontal) is provided such that specific track configurations of certain lengths may be easily secured to each other and the wall mounts.

Figure 6:
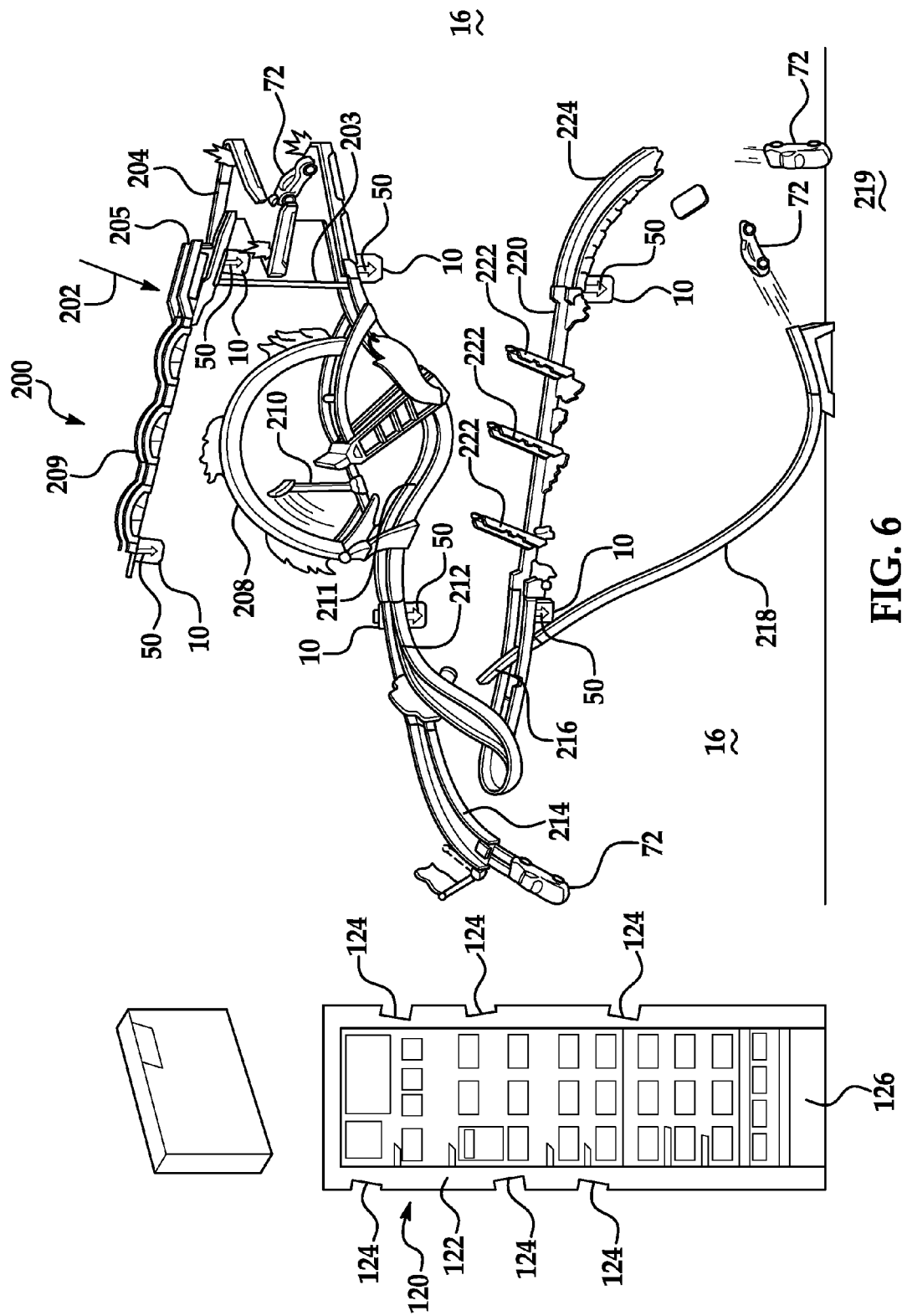
FIG. 6 is a perspective view of track set in accordance with still another exemplary embodiment of the present invention.

Referring now to at least FIG. 6 another wall mounted track set 200 is illustrated. Once again and similar to the previous embodiments, six wall mounts 10 are utilized for securing the track set 200 to wall 16. Of course, the number of wall mounts may increase or decrease depending on the configuration of the tracks being mounted to the wall. As discussed above, some or all of the wall mounts may have a plumb bob indicator 50. In this embodiment, the track set has a launch triggering system 202 that permits a plurality of cars 72 to be queued up, and each car will trigger the release of another car from the launch triggering system. For example, the first released car will strike member 203, which in turn releases another car from the launch triggering system by moving a gate 205 upward. In this embodiment, a plurality of cars may be queued up on the first track segment 209.

In this embodiment, the 180° turn is provided by a zigzag track segment 204 that eventually redirects the toy vehicles into a spring or elastically loaded loop system 206. The spring loaded or elastically loaded loop system, which when loaded propels the toy vehicle or object through a loop 208 via an arm 210 or alternatively when the loop is not loaded the toy vehicle or object with pass through the segment without traversing the loop. In this embodiment, the spring loaded arm is released by a release mechanism that is actuated by a vehicle that traverses through the loop system and thus the car is propelled by the arm. Alternatively, other equivalent mechanism may be utilized to launch vehicles into the loop. In one embodiment the loop system, the loop and the arm are configured such that after arm 210 is triggered and if it is not reset to propel another vehicle through loop 208, the next vehicle can travel down the track by traveling through a lower portion 211 of the loop system and continuing on. The loop system or arm is reset by hand and can be reset before the next car is released or alternatively the loop system and arm can be left sprung and all following vehicles take the lower dip section 211 of the loop system.

Thereafter, the vehicle may travel to yet another feature of the track set via a diverter 212 that allows a user to select from at least two different track options one of which may terminate at a finish line 214 while the other allows the vehicle to traverse on to yet another track segment. Still further yet another diverter 216 is provided that allows the user to select from a lower track 218 that is positioned on a floor surface 219 or an upper track segment 220 that is still secured to the wall. In this embodiment track segment 220 has a plurality of pivotally mounted portions 222 that can be positioned or spring biased into an upward configuration wherein the vehicle passing therethrough may push the segments down such as it travels through track segment 220. Thereafter and after the vehicle passes portions 222 will spring back up such that they are in place for a subsequent vehicle to make contact with them and once again push them down. Thus portions 222 are spring loaded and once a vehicle hits the bridge section and causes the bridge section 222 to lie down and then passes over the bridge. Once the vehicle passes therethrough, the bridge sections 222 pop back up and the next vehicle. In an alternative embodiment, the portion are not spring biased and are merely pushed down by a lead vehicle such that a vehicle subsequently traveling down this track path will move therethrough at a fast rate since it does not have to knock down the pivotally mounted track portions 222. Still further, track segment 220 can be coupled to another end segment 224. As in the previous embodiments, a paper-template mounting system 120 is provided.

Figure 7:
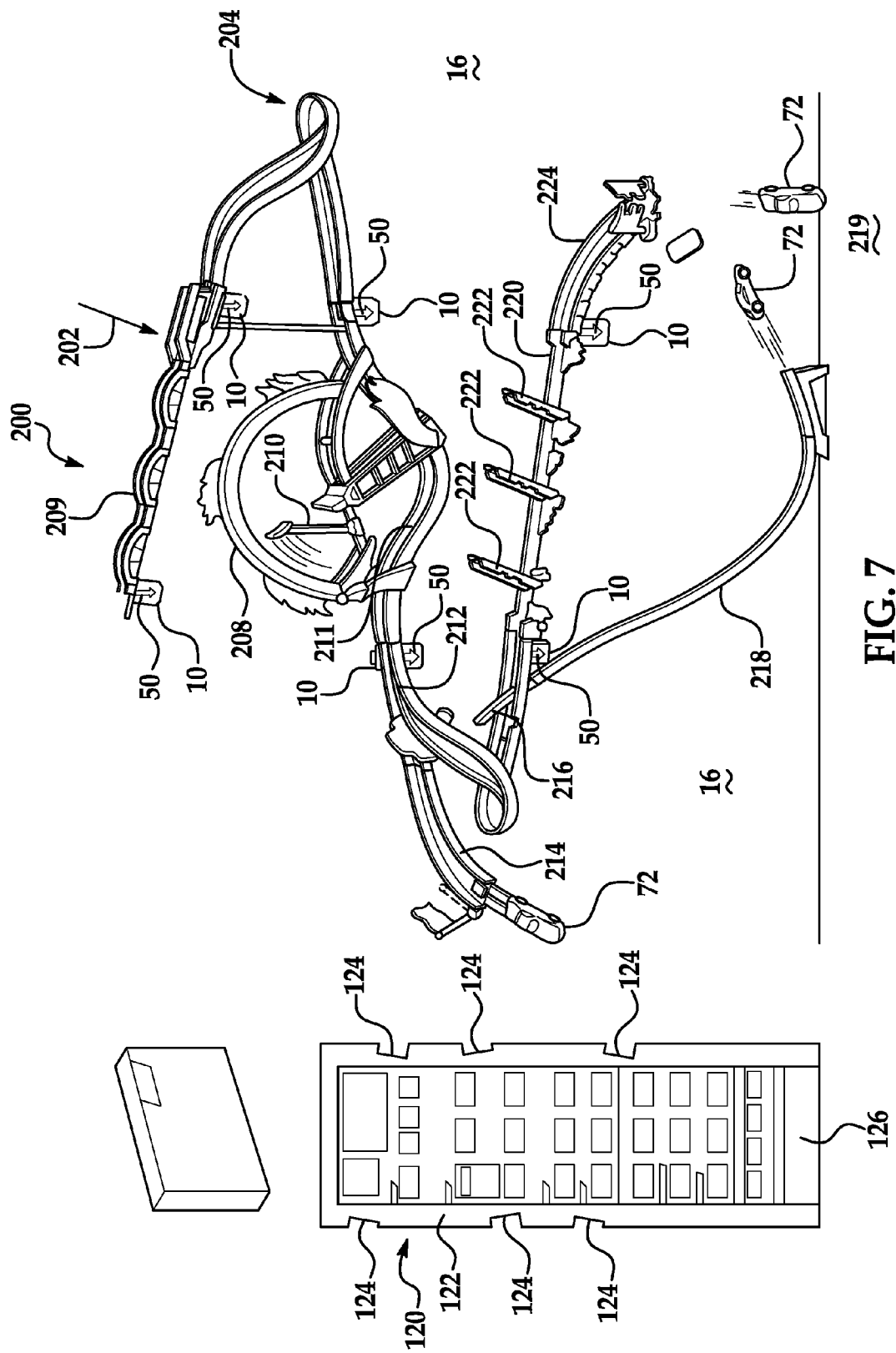
FIG. 7 is a perspective view of track set in accordance with still another exemplary embodiment of the present invention.
Figure 8:
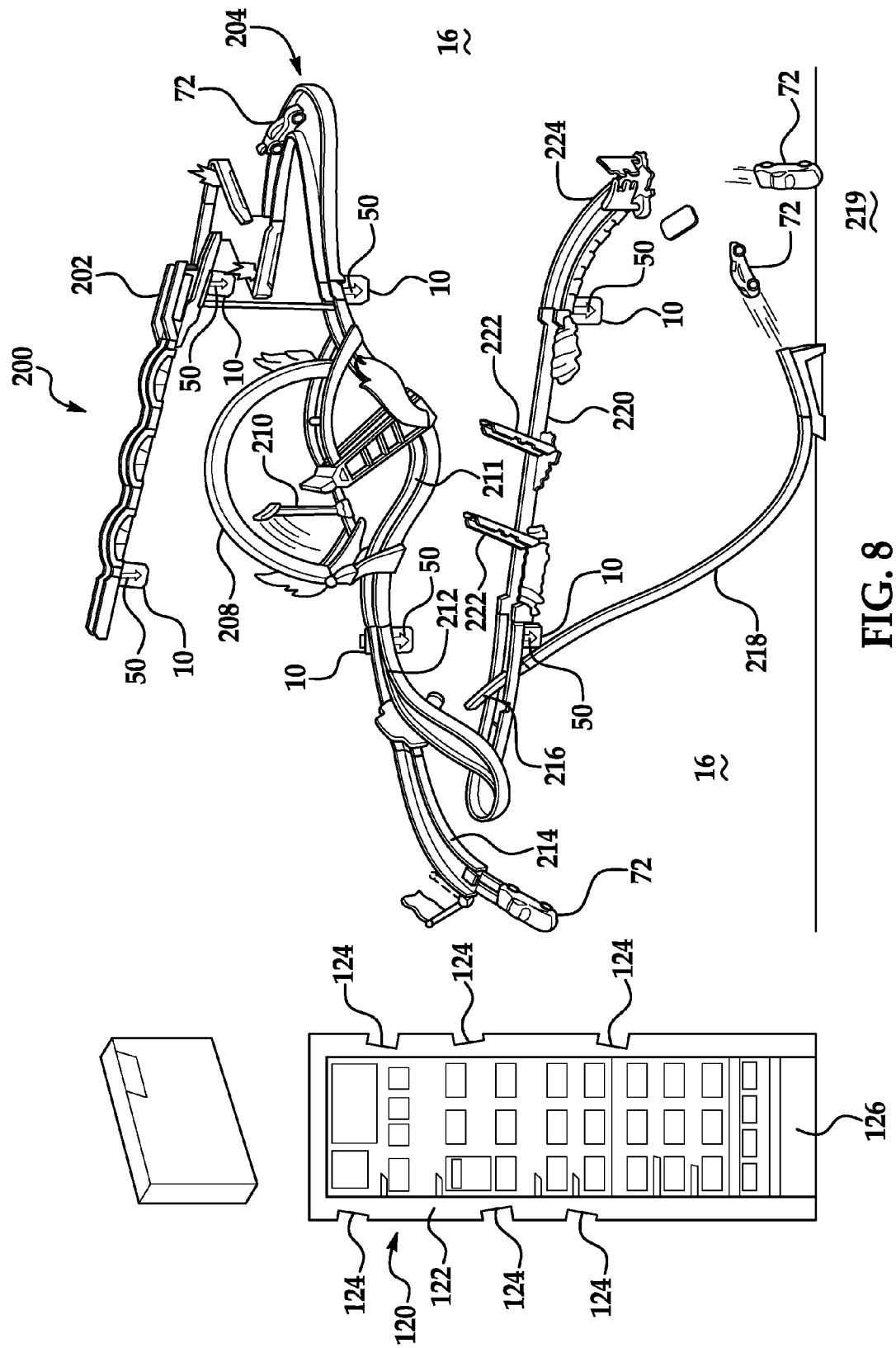
FIG. 8 is a perspective view of track set in accordance with still another exemplary embodiment of the present invention.

FIGS. 7-8 illustrate other alternative configurations of the track set of various embodiments of the present invention. In an alternative embodiment, the track segment is configured to have a plurality of receiving areas, each of which can hold a single toy vehicle or object and the impact of one object coming down the track will push each toy vehicle or object off the track segment.

In each of the illustrated embodiments it is understood that the series of events or stunts located between each of the various stunt elements (track diverters, collapsible bridges, jumps, loops and other stunts included in the track path) as well as the reversal devices (180 degree turn); flipping devices (360 rotation about a toy vehicle axis); and a combination flipping/reversal device, can be rearranged in a plurality of sequences and/or parallel paths to provide numerous play patterns. For example, each of these items may be interchanged from set to set or within each set, in this way, a user can experience diverse track play and excitement time and time again.

Figure 9:
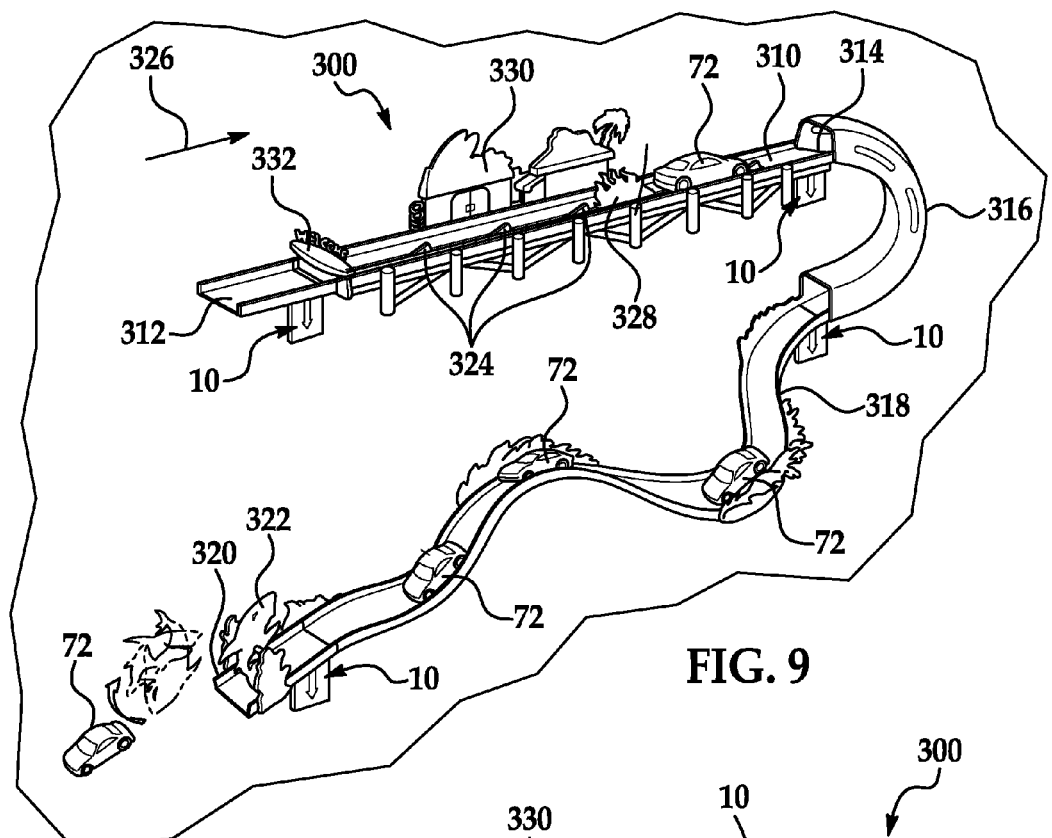
FIGS. 9-12G are perspective views of track sets in accordance with still other exemplary embodiments of the present invention.
Figure 10:
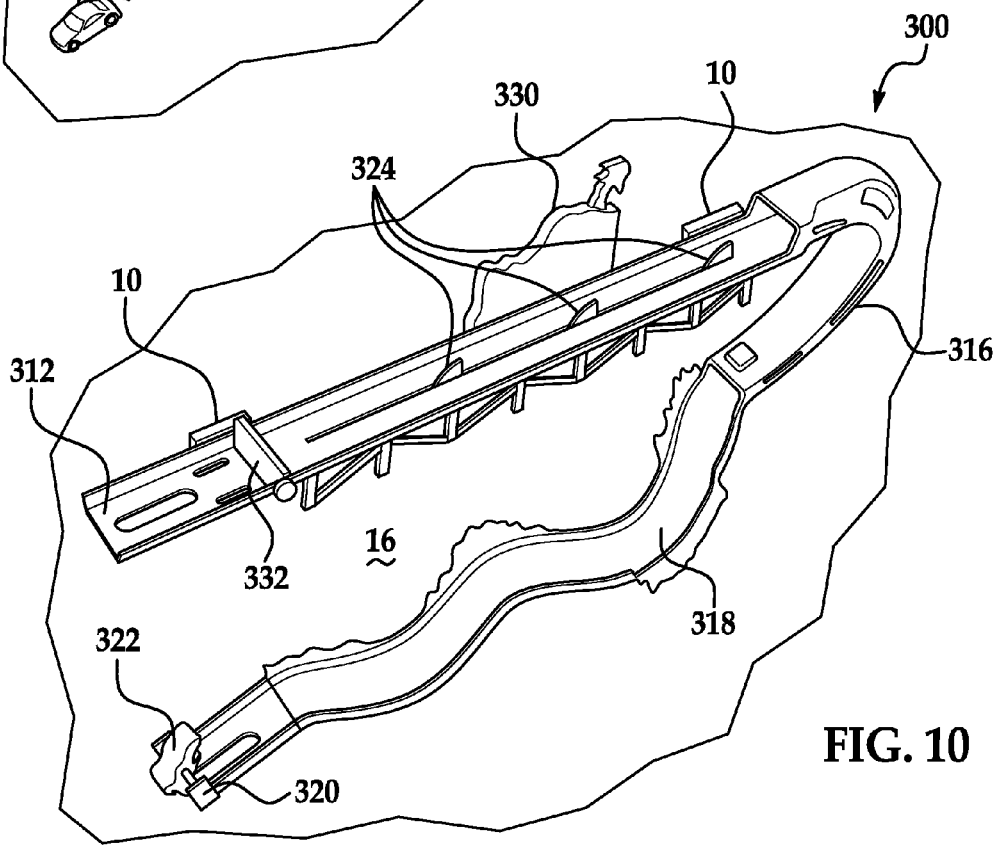
Figure 11:
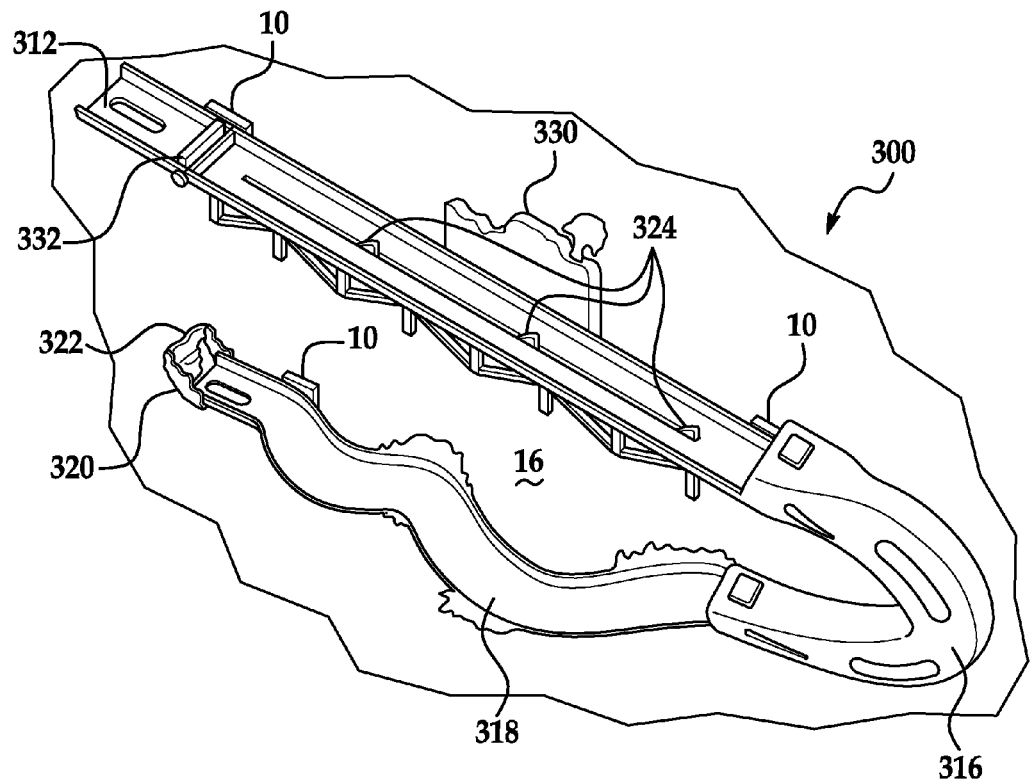
Figure 12A:
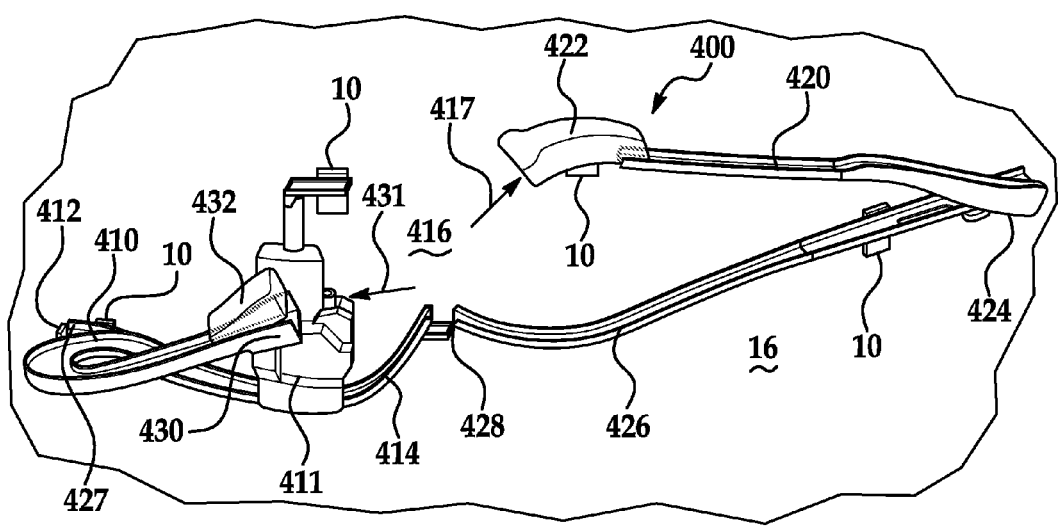
Figure 12B:
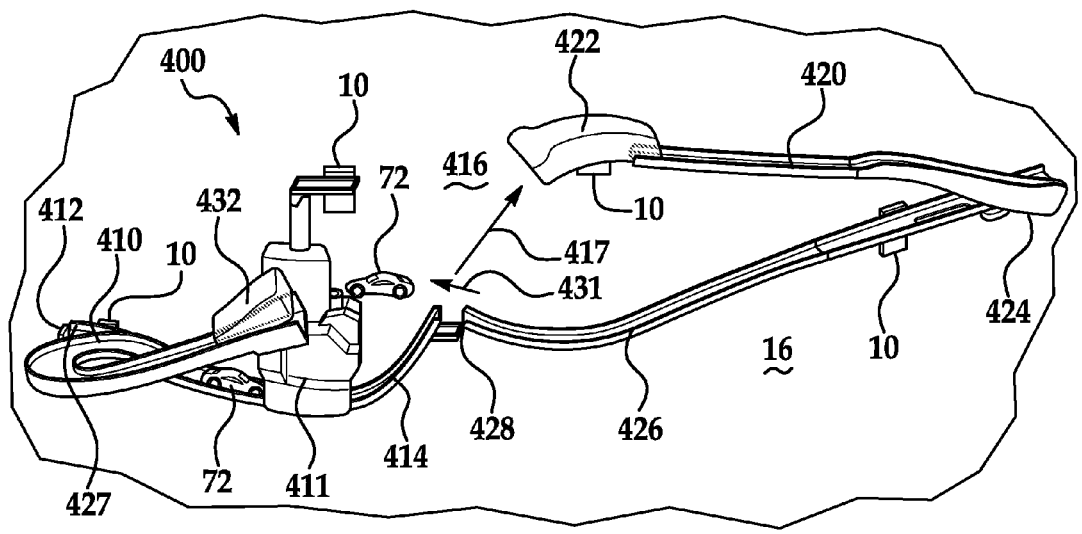
Figure 12D:
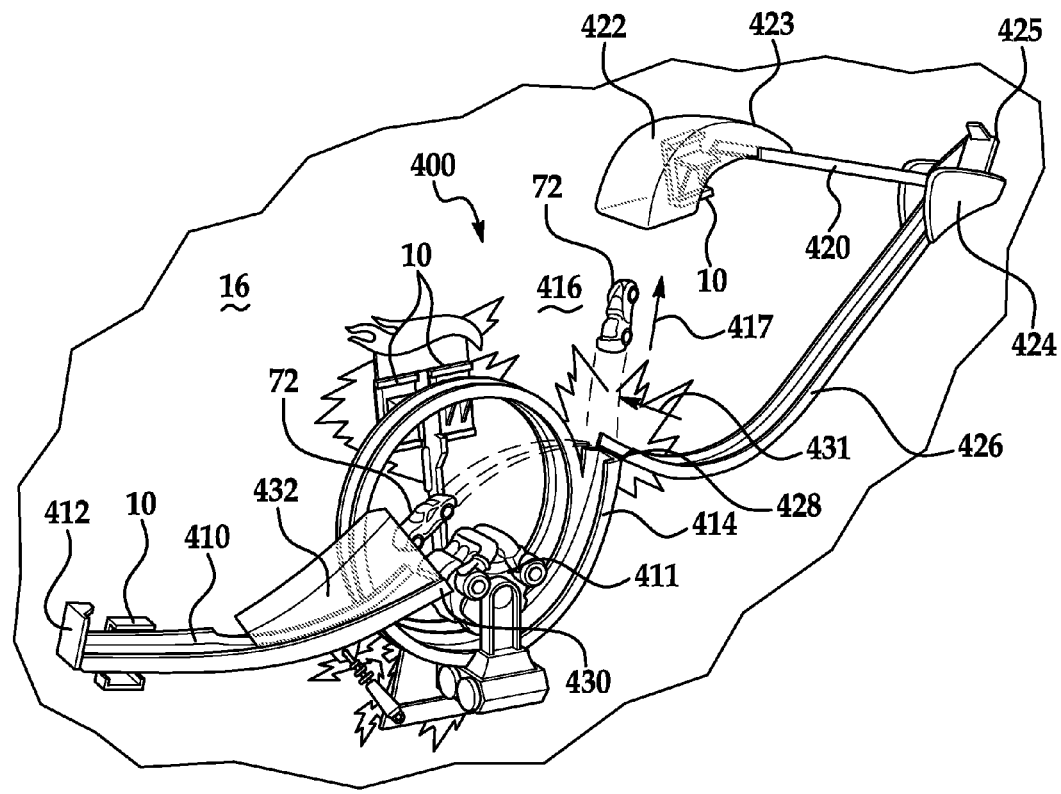
Figure 12C:
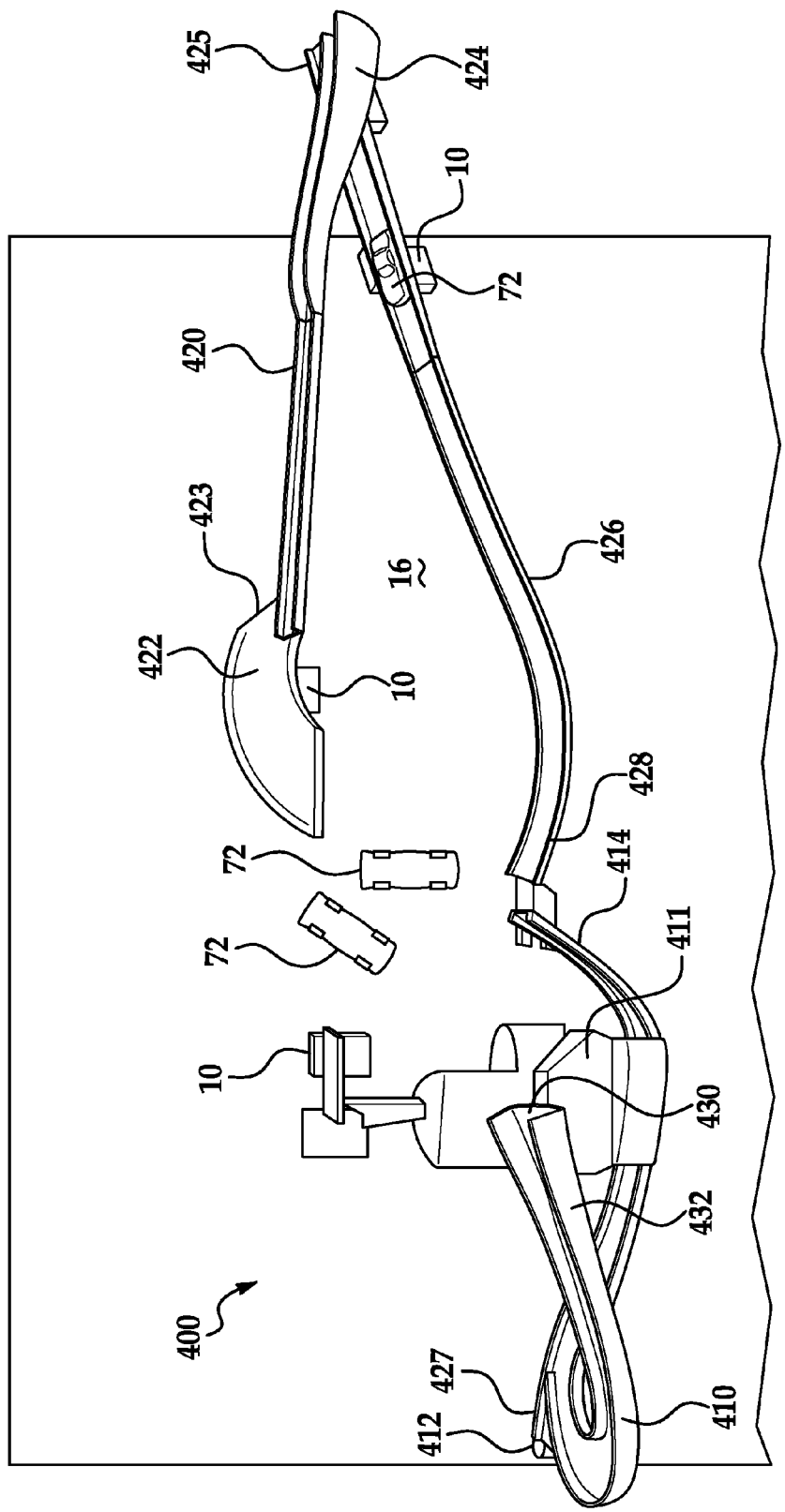
Figure 12E:
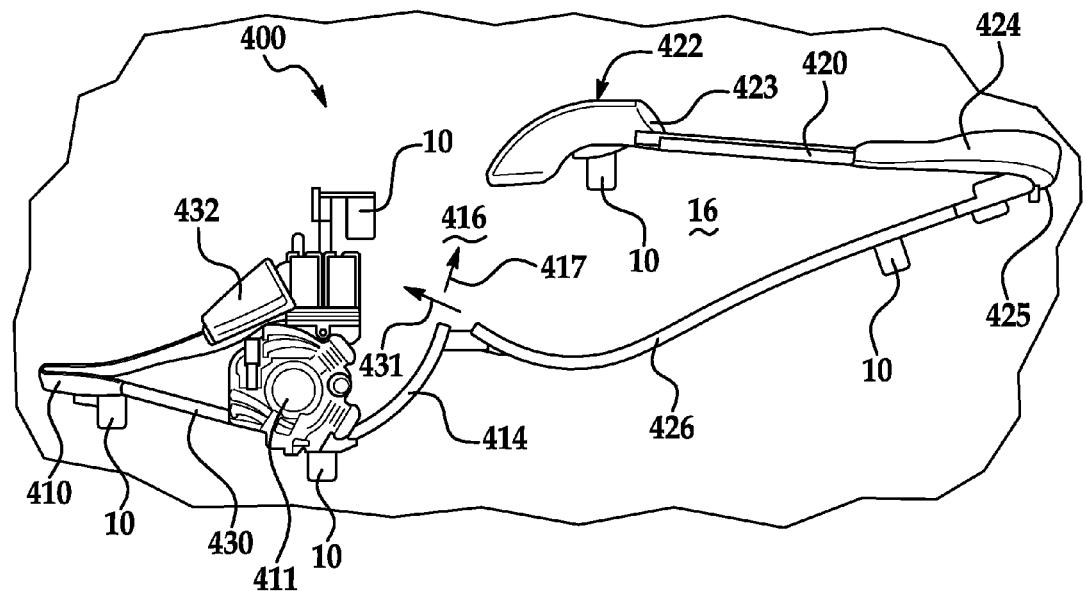
Figure 12F:
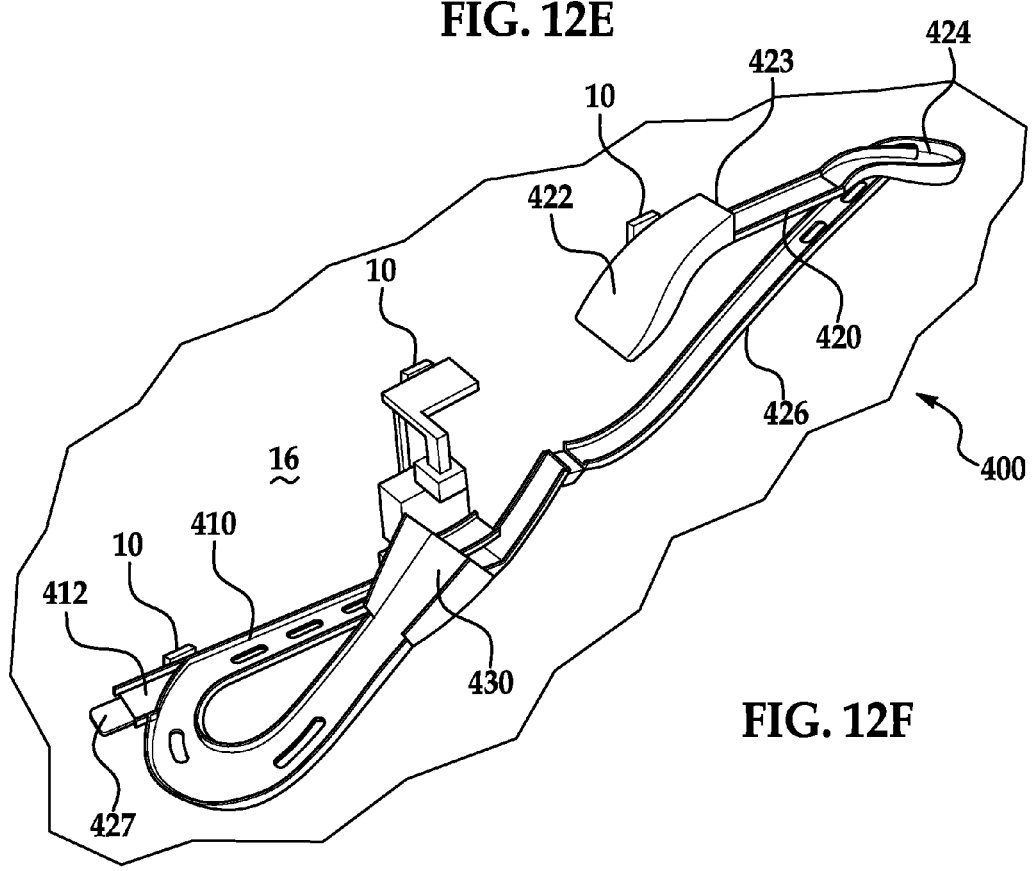

Referring now to FIGS. 9-11 another alternative embodiment of the present invention is illustrated. Here and as in the previous embodiments, the track set 300 provides a track path with variety of options wherein vehicles or objects placed on the track path will move in both a horizontal and vertical manner and in some instances in a left to right and right to left manner as the vehicle or object also moves downwardly. Once again, the illustrated track set utilizes the aforementioned wall mounts wherein a plurality of sidewall tracks are mounted perpendicular or substantially perpendicular to a vertical wall and in some instances joined by a u-turn member or device.

More specifically, the embodiment of FIGS. 9-11 includes a first track segment 310 having an inlet 312 and an outlet 314 coupled to a 180 degree U-turn segment 316 which couples the first track segment to a twisting turn track segment 318, that terminates with an outlet portion 320. In the illustrated embodiment, outlet portion 320 comprises a rotatable member 322 that is rotatably supported proximate to the outlet portion of the twisting turn track segment 318 and is located such that the rotatable member 322 is contacted and rotated by an object or car 72 that travels through the track set. In one embodiment, the first track segment also has a plurality of trigger mechanisms 324 that are pivotally or rotatably mounted to the first track segment such that as the toy vehicle 72 travels in the direction of arrow 326 along the first track segment the trigger mechanisms 324 are pushed downwardly and a second portion 328 rises up through a slot in the first track segment to provide a desired effect. For example and as illustrated in the non-limiting embodiment of at least FIG. 9, the second portion 328 resembles flames extending from the rear portion of the toy vehicle.

The first track segment 310 further comprises a facade 330 resembling scenery such as a dock and portions 328 resemble flames that appear to be chasing the vehicle as they pop up behind the vehicle as it passes the various triggers along the track. Still further, the U-turn segment 316 features an enclosed twist tube, that rotates the vehicle about 180° in the horizontal axis, while allowing the vehicle to descend in the vertical axis (without flipping the vehicle on its roof). This tube accomplishes this by rotating the vehicle about 180° along the horizontal axis of the length of the vehicle (Y-axis), while simultaneously rotating the vehicle about 180° along the horizontal of the width of the vehicle (X-axis). Thereafter, the vehicle exits the twist tube and travels along a twisting segment 318 until it comes into contact with outlet portion 320.

As illustrated in FIGS. 10 and 11, the first track segment 310 is mounted to the wall 16 in a downwardly sloping direction towards U-turn segment 316 such that gravity will pull the vehicle downwardly towards the outlet portion 320 of the track set. In addition, a gate 332 is pivotally mounted to the first track segment proximate to the inlet end 312 to provide a means for releasing the vehicle down the track set.

Referring now to FIGS. 12A-12G another alternative embodiment of the track set is illustrated. Here a track set 400 is mounted to a wall 16 by a plurality of wall mounts 10. In this embodiment, a first track segment 410 is provided with an inlet 412 and the first track segment is angularly positioned with respect to the wall such that a vehicle or object 72 traveling along the first track segment is drawn towards a booster 411. Booster 411 is configured to provide a force to the vehicle 72 in order to launch it from a ramp member 414 into a gap 416 positioned between ramp member 414 and an inlet member 418 of another track segment 420. In one non-limiting embodiment, booster 411 comprises at least one or a pair of wheels rotatably mounted proximate to the track segment wherein the rotatable wheels are mechanically driven by a motor or any other equivalent device in order to impart a force to the object or a vehicle 72. For example, the rotating wheels will frictionally engage a surface of the vehicle in order to propel the same along the track segment. Accordingly, booster 411 is configured to provide a sufficient amount of force to vehicle 72 such that it will be launched into gap 416 by ramp 414.

As illustrated, vehicles 72 are launched into the gap 416 in the direction of the arrow 417 by booster 411 such that they can be received onto the second track segment 420 via a hood or guiding member 422, which is coupled to inlet member 418 of track segment 420. Guiding member 422 diverts vehicles traveling from ramp member 414 into track segment 420. In one embodiment, hood or guiding member 422 is manufactured out of a translucent material such that a user can see the vehicles or objects contacting guiding member 422.

Once an object or toy vehicle is launched into gap 416 from ramp member 414 it is received into track segment 420 by guiding member 422. Therefore, the vehicle travels towards a U-turn segment 424 which is configured to cause the vehicle to reverse its direction of travel in the horizontal direction while also traveling downwardly. U-turn segment 424 will direct the object or toy vehicle into another track segment 426 which terminates in an upwardly end portion 428 such that the vehicle will once again be launched into gap 416 from end portion 428. As illustrated, end portion 428 is proximate to the end portion of ramp member 414 and is configured to launch a vehicle into gap 416 towards an inlet member 430 of the first track segment 410.

Accordingly, a vehicle or object being launched from track segment 426 will travel into gap 416 in the direction of arrow 431 and if unobstructed will be received within inlet member 430 of first track segment 410. Similar to the second track segment 420, the inlet member 430 of the first track segment 410 also has a guiding member 432 configured to guide the objects or vehicles onto the first track segment. Once again, guiding member 432 may also be constructed out of a translucent material such that a user can see the vehicles contacting guiding member 432.

FIG. 12G illustrates that guiding member 422 further comprises a flap member 423 that is pivotally mounted to an exit end of the guiding member, such that a vehicle or object being captured or received from gap 416 by the guiding member 422 is redirected towards the track surface of the track segment 420 and the velocity of the vehicle is velocity reduced by contacting flap member 423. This redirection and reduction of the velocity (required for vehicle 72 to traverse gap 416) will ensure that the vehicle will not travel off track segment 420 and accordingly will travel along the same towards U-turn segment 424.

In one embodiment, multiple vehicles are capable of traversing along different portions of track set 400 such that multiple vehicles may be traversing along the tracks that at the same time. Once the vehicles or objects are received into the first track segment from gap 416 they are directed towards booster 411 such that they can, once again, be launched into gap 416 from ramp member 414 in the direction of arrow 417. As illustrated, arrows 417 and 431 depict paths of travel which may intersect with each other and if a vehicle is launched from end portion 428 of track segment 426 at the same time another vehicle is launched from ramp member 414 the vehicles will collide midair in gap 416 (see FIG. 12C).

In addition, U-turn segment 424 further comprises an inlet portion 425 that is configured to be coupled to other track sets which may or may not be secured to wall 16. Similarly, the inlet end 412 of the first track segment 410 is also configured to be secured to another track segment, which may or may not be secured to wall 16. First track segment 410 can also be configured to have a diverter member 427 that is pivotally secured to first track segment for movement between a first position and a second position wherein vehicles traveling along the first track segment will be directed towards booster 411 or alternatively away from booster 411.

Accordingly, this embodiment provides a wall track set that has an overhead vehicle booster configured to launch vehicles vertically from an upwardly facing jump ramp 414 wherein the vertically launched vehicles are captured by a catch or guiding member 422 incorporating a one-way flap 423 which redirects and reduces the speed of the incoming vehicle. Still further, the track set includes a diverter on the first track segment which allows the vehicle to return to the booster 411 and be launched into the gap 416, creating crash opportunities, or alternatively redirecting the vehicle to a gravity driven track set. An additional feature of this embodiment is that certain track segments or portions are configured to be attachable to various other track sets. For example, both the entrance end and exit end of the track set are configured to be coupled to track segments of other track sets, which may or may not be mounted to the wall the track set is secured to.

Referring now to FIGS. 13A-14B one contemplated U-turn device 90 is illustrated. In this embodiment, the U-turn device 90 is a reversible curve track segment 91 configured to be releasably coupled to other track segments of the track set. In this embodiment, the reversible curve track segment 91 allows a vehicle traveling thereon to be rotated 180 degrees in the left to right travel direction or right to left travel direction. Since clearance for a track piece mounted against a wall 16 is a challenge, the application of a single gravity track piece capable of altering vehicle direction 180 degrees in either configuration is unique. As illustrated in the attached FIGS., the gravity track piece features a track segment 93 on both sides of the running surface, allowing the track piece to be mounted right-side up and up-side down. For example, FIG. 13A shows a track segment 91 in one position and FIG. 13B shows the same track segment in an inverted position. As such, the right-side up configuration shown in FIG. 13A allows for gravity assist rotation of a vehicle travelling in the right to left direction, while the up-side down configuration illustrated in FIG. 13B allows for gravity assist rotation of a vehicle travelling in the left to right direction.

Figure 14A:
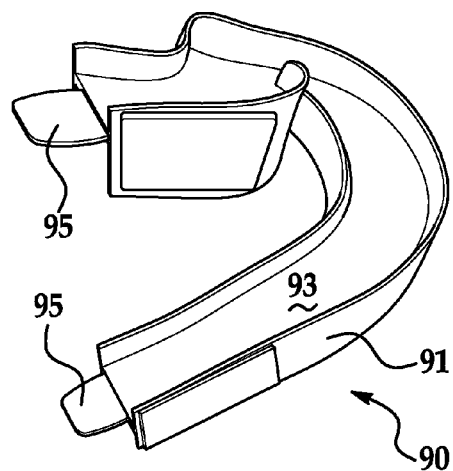
Figure 14B:
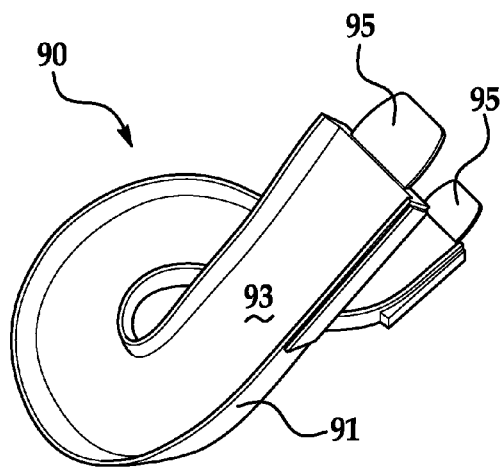

Similar orientations of another reversible curve track segment 91 having a different configuration are illustrated in FIGS. 14A and 14B. The unitary track segments 91 also have tab members 95 configured to engage complementary features of track segments of the track sets according to various embodiments of the present invention. Accordingly, these unitary track segments 91 provide a means for redirecting a vehicle traveling thereon to be rotated 180 degrees in the left to right travel direction or right to left travel direction while using the track segment 91 in conjunction with a wall mounted track set and furthermore additional configurations are provided by simply inverting the reversible track segment 91.

Figure 15A:
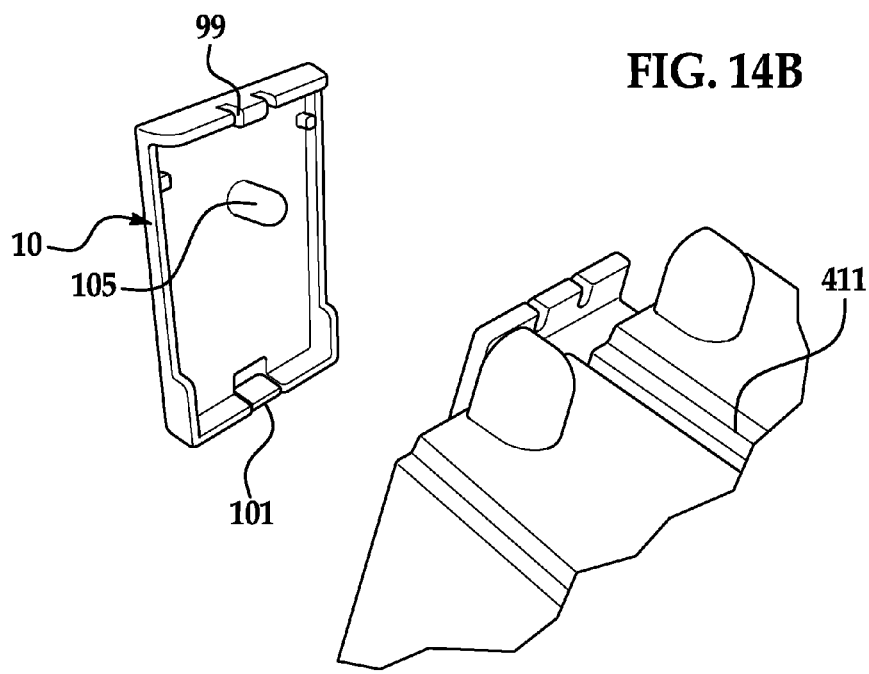
FIGS. 15A-15C are views illustrating a booster safety mechanism in accordance with one exemplary embodiment of the present invention.
Figure 15B:
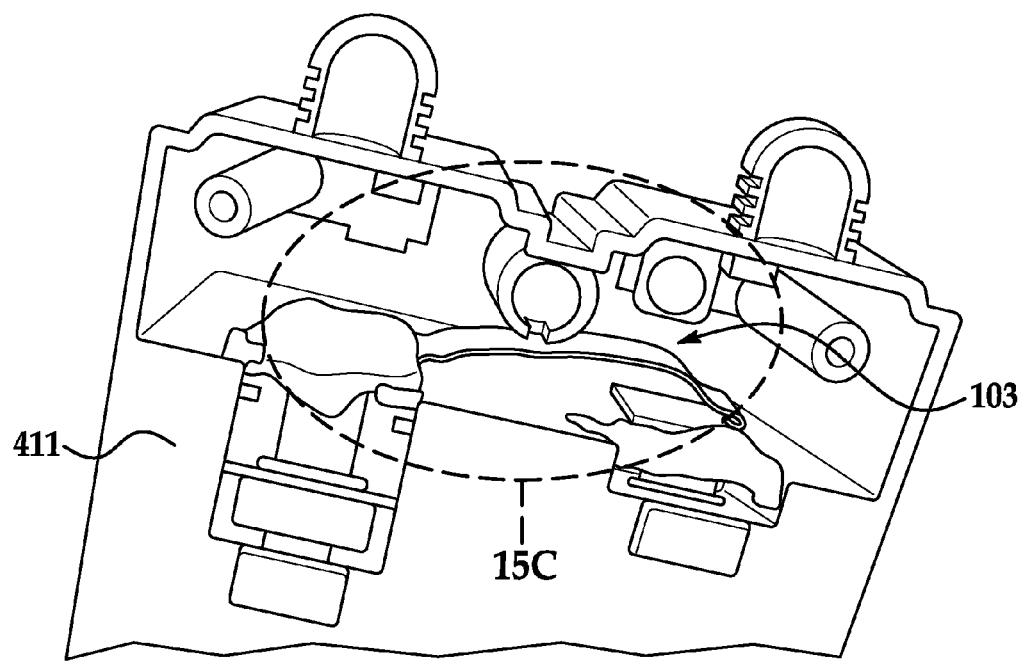
Figure 15C:
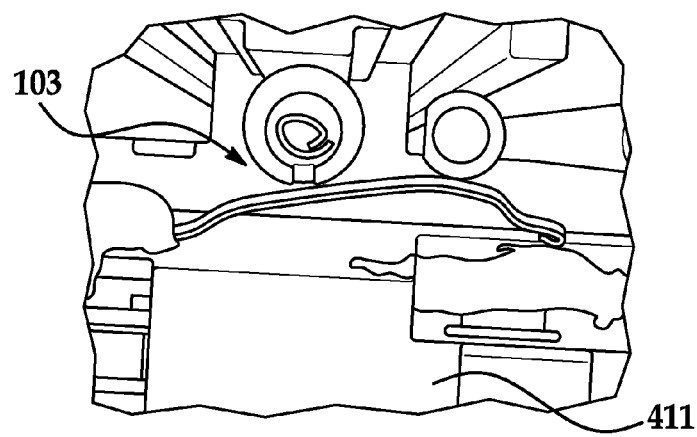

Referring now to FIGS. 15A-15C, another embodiment of the present invention is illustrated. In this embodiment, wall mount 10 is configured to engage and support a booster 411 via tab members 99 and 101 that are configured to engage complimentary features of a housing of the booster 411. As mentioned above, booster 411 is configured to impart a force to the vehicle 72 in order to launch or propel it along track segments of the wall mounted track set. In this embodiment, a booster safety device is provided such that no power is provided to the wheels of the booster from a power supply of the booster when it is removed from the wall mount. Accordingly, the wall mount is configured to kill power to the booster when it is removed from the wall mount by interfacing with a switch 103 on the booster 411.

In the illustrated embodiment, this is accomplished by utilizing a protrusion 105 found on the wall mount 10, wherein the protrusion 105 engages the switch 103 of the booster. The switch 103 is biased into an open loop configuration by a spring or any other equivalent device such that a circuit to the power supply of the booster is open when the booster is not secured to the wall mount 10 having the protrusion 105. When the booster 411 is secured to the wall mount 10 with protrusion 105, the protrusion 105 urges the switch 103 to form a closed loop configuration and the booster is energized.

Figure 16:
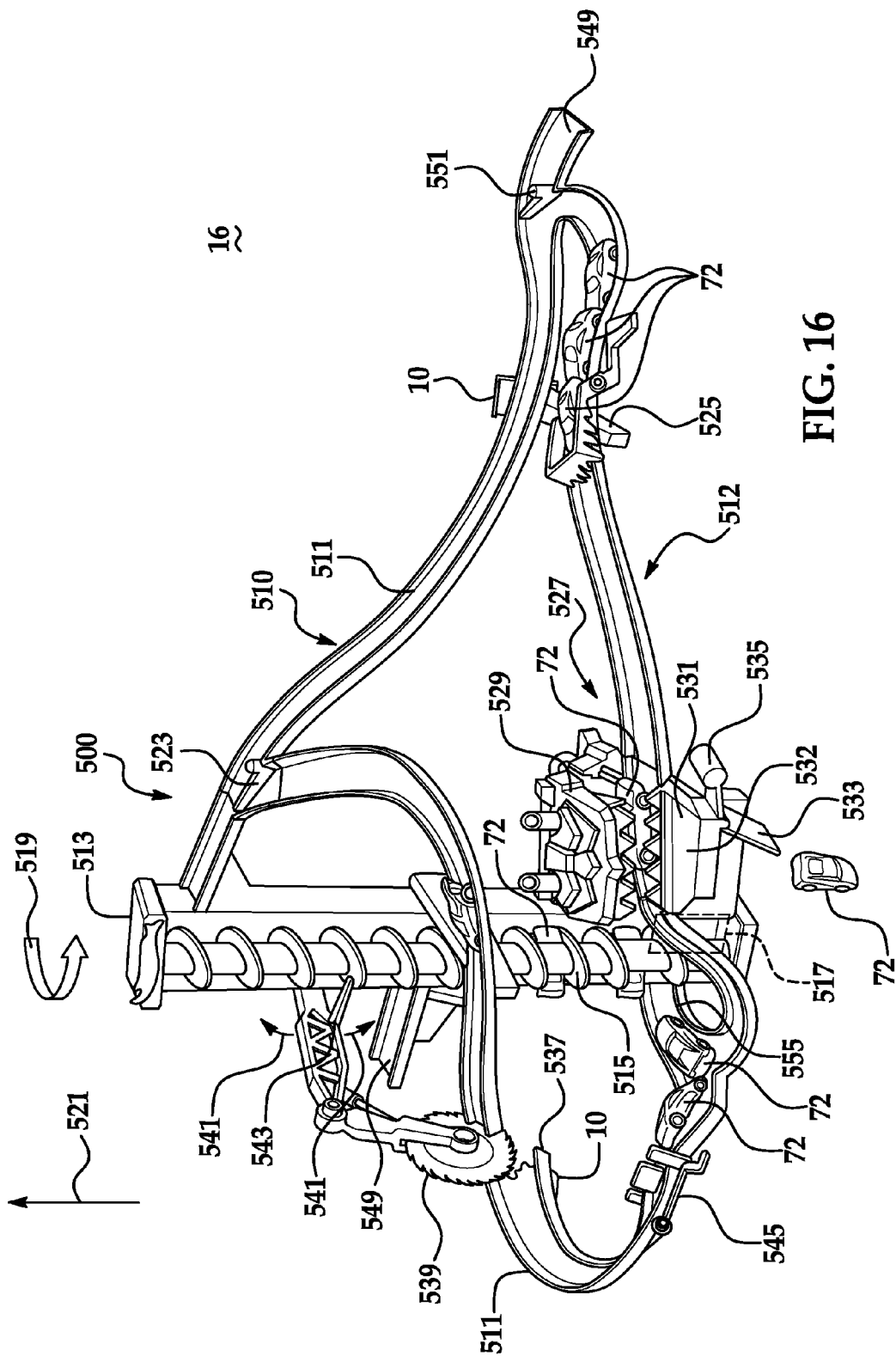
FIG. 16 is a perspective view of a track set according to another alternative exemplary embodiment of the present invention.

Referring now to FIG. 16 another alternative embodiment of the track set is illustrated. Here a track set 500 is mounted to a wall 16 by a plurality of wall mounts 10. In this embodiment, a first upper track section 510 comprising a plurality of track segments 511 is angularly positioned with respect to the wall such that a vehicle or object 72 traveling along the first track section 510 moves towards a second lower track section 512 that also comprises a plurality of track segments 511.

As illustrated, the second lower track section directs the toy vehicles 72 towards a bottom portion of a tower 513. As illustrated, the tower 513 has a corkscrew 515 rotationally secured to the tower 513. Corkscrew 515 is coupled to a motor 517 illustrated by the dashed lines in FIG. 18. Once the motor is energized, the corkscrew 515 is rotated in the direction of arrow 519. This rotational movement will cause vehicles 72 entering the bottom of the corkscrew 515 to engage a surface of the corkscrew and be drawn upwards in the direction of arrow 521 towards a top of the tower 513. In other words, the rotating cork screw acts like an elevator. Once the vehicles 72 reach the top of the tower 513 they are redirected to the upper track section 510 where they can once again travel down the upper track section 510 towards the lower track section 512.

As illustrated, a portion of the first upper track section has a diverter 523 pivotally mounted thereto for movement between a first and a second position, wherein one of two possible track paths down the first upper track section can be selected. Of course, numerous track configurations are contemplated. A first one of the two possible track paths includes a U-turn track section that redirects the vehicles 72 towards a starting gate 525. The starting gate 525 is pivotally mounted to the track segment for movement between a closed stopping position and an open release position wherein a user can stop the vehicles 72 at gate 525 and then manually release the gate 525 to allow the vehicles to travel towards the lower portion of tower 513 and corkscrew 515. In an alternative embodiment, gate 525 is set to trigger or move from a blocking position to an unblocking position when a predetermined amount of vehicles 72 are stacked behind the gate 525 (e.g. the weight of the vehicles backed up triggers the gate and allows at least one vehicle to pass therethrough).

Also shown between gate 525 and the bottom of the tower 513 proximate to the corkscrew 515 is a chomping device 527 comprising an upper jaw portion 529 pivotally mounted to a lower jaw portion 531. In one embodiment, the upper jaw portion 529 is linked or coupled to the motor driving corkscrew 515 or is coupled to the corkscrew 515 such that energizing of the motor and/or rotation of the corkscrew causes the upper jaw portion to pivot with respect to the lower jaw portion to resemble a chomping or biting action of the chomping device 527.

As the chomping device 527 reciprocates between an open position and a closed position, a user of the track set will try to time the release of the vehicles 72 from the gate 525 such that the vehicles 72 will pass through the chomping device when it is in an open position. If the timing is off the vehicles are captured by the chomping device and deposited in a hopper 532 of the chomping device. Vehicles captured in the hopper 532 of the chomping device 527 can be released through movement of a trap door 533 coupled to a release lever 535. Alternatively, trap door 533 may open due to the weight of the vehicles being captured in the hopper 532.

As illustrated, an alternative path from the top of the tower 513 to the corkscrew 515 at the bottom of the tower is provided. This alternative path further comprises a jump or gap 537 located therein wherein one end of the track path at one end of the gap 537 is higher than an opposite lower end of the gap 537 such that vehicles travelling down this path will jump across the gap 537. However and to add intrigue and random chance to the track set an obstacle 539 is pivotally mounted to the tower for movement between a first blocking position and a second non-blocking position in the directions of arrows 541.

In order to facilitate this movement an arm member 543 extends from the obstacle 539 and contacts the corkscrew such that rotation thereof will cause the pivotal movement of the obstacle 539 between the blocking and non-blocking positions as it engages the surfaces of the rotating corkscrew. Accordingly and if the obstacle is in the blocking position, a vehicle 72 attempting to jump the gap 537 will contact the obstacle 539 and the vehicle will not traverse the gap 537. Down the track from the obstacle is another starting gate 545 pivotally mounted to the track such that cars 72 that have traversed the gap 537 can be received at the bottom of the gate of the track set 510 and thus, manually launched towards the bottom of the corkscrew and picked up by the same and moved towards the top of the tower 413.

In addition and in one non-limiting embodiment, a track section 555 proximate to the bottom of the corkscrew is pivotally mounted to the track set such that is may pivot up and down as the corkscrew is rotated.

Track set 510 also has inlet or outlet portions 549 linked to the track sections such that the track set 510 can be connected to other track sets or vehicles may simply be added to the track set. In one embodiment, another pivotally mounted diverter 551 can be secured to the track set 510 proximate to the track paths and inlet or outlet portions.

Referring to FIG. 20, in an embodiment of the track set, the corkscrew 515 is configured to receive multiple vehicles or objects 72, and retain the vehicles or objects 72 in a substantially consistent horizontal orientation while the vehicles 72 vertically traverse the corkscrew 515. The riding platform 590 of the corkscrew 515 is configured to retain the vehicle 72, and allow for at least two of the wheels of the vehicle 72 to rotate upon the riding platform 590. The rear wall 594 of the tower 513, in combination with the central shaft 592 of the corkscrew 515, loosely entrap the vehicle in the substantially consistent horizontal orientation. In another embodiment, at least one of the wheels of the vehicle 72 may rest beyond the surface of the riding platform 590, confining the vehicle 72 in the substantially consistent horizontal orientation as the vehicle 72 traverses the corkscrew 515.

Figure 17:
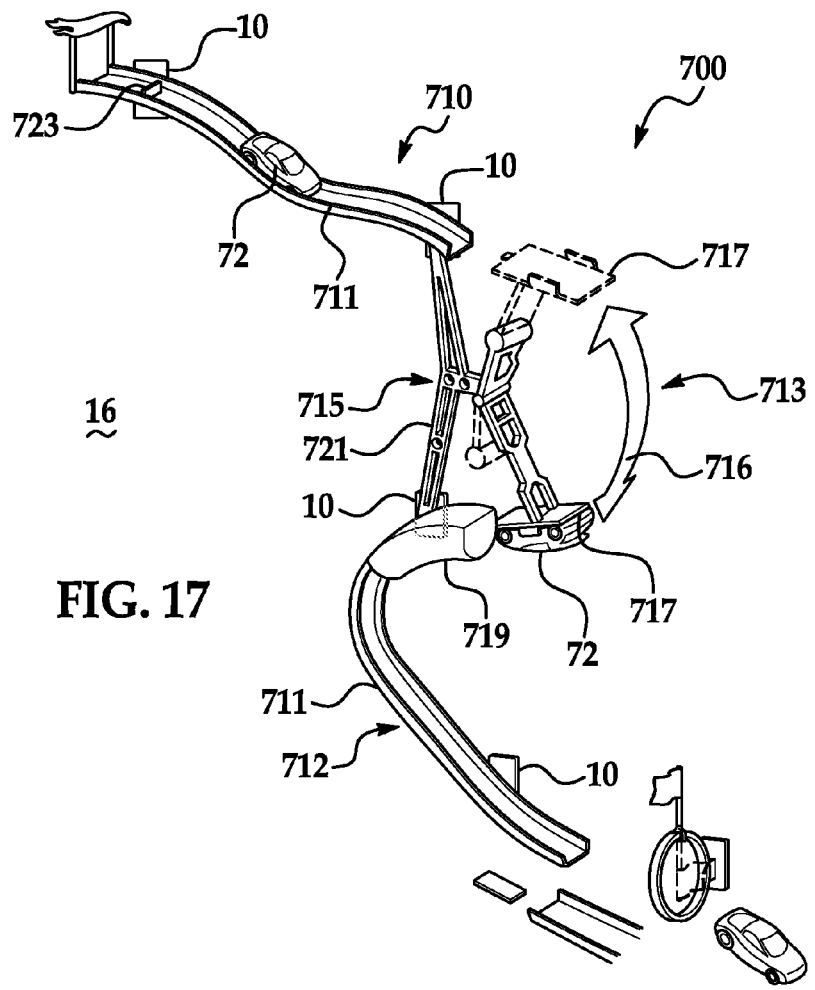
FIG. 17 is a perspective view of a U-turn device according to another alternative exemplary embodiment of the present invention.

Referring now to FIG. 17 another alternative embodiment of the track set is illustrated. Here a track set 700 is mounted to a wall 16 by a plurality of wall mounts 10. In this embodiment, a first upper track section 710 comprising at least one track segment 711 is angularly positioned with respect to the wall 16 such that a vehicle or object 72 traveling along the first track section 710 moves towards a second lower track section 712 that also comprises at least one track segments 711.

As illustrated, the first upper track section 710 is separated from the second lower track section by a gap 713 that is traversed by a vertical U-turn device 715. The U-turn device 715 includes a carriage 717 for capturing the vehicle 72 from the upper track 710 and transports the vehicle about 180 degrees in the vertical axis to release the vehicle onto the lower track section 712 in an inverted manner. In one exemplary embodiment, the carriage 717 is biased towards the upper track section 710 by a resilient member or spring, and uses the momentum of the vehicle 72 travelling down the gravity track to actuate the U-turn device 715 such that movement in the direction of arrows 716 is possible.

Carriage 717 of the U-turn device 715 is configured to releasably retain and subsequently release the vehicle 72 as the U-turn device travels from the upper track section 710 to the lower track section. The carriage 717 may also incorporate a cage or shroud at least partially encapsulating the vehicle 72, for retaining the vehicle on the carriage in transit.

As illustrated, a cage or shroud 719 is located on the inlet portion of track section 712 to facilitate smooth transition of the vehicle from the upside down orientation when released. In one non-limiting exemplary embodiment, the U-turn device 715 has a structural member 721 secured to each of the upper and lower track sections 710, 712 and/or the wall mounts 10 secured thereto to provide stability to the track set 700.

In one non-limiting configuration, the upper track section 710 is provided with movably mounted start gate 723 that can be depressed into an aperture in the track such that a vehicle or object can roll down the first track section towards the U-device 715.

In accordance with an exemplary embodiment and as with all of the aforementioned track sets this track set can be mounted as a stand alone set or be combined with other wall mounted track sets.

Figure 18A:
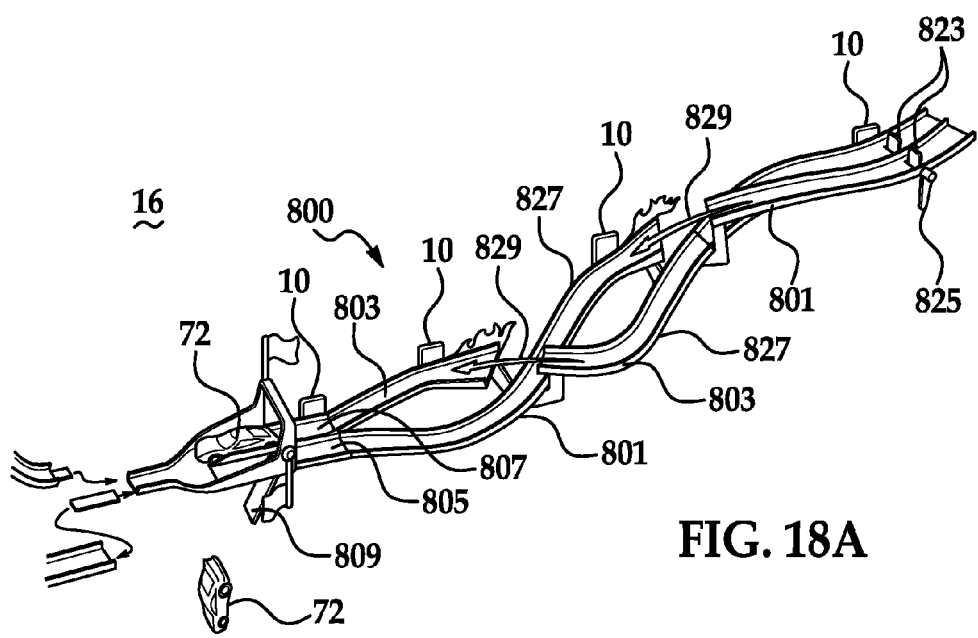

Referring now to FIGS. 18A-18C another alternative embodiment of the track set is illustrated. Here a track set 800 is mounted to a wall 16 by a plurality of wall mounts 10. In this embodiment, the track section 810 comprises two independent track paths 801, 803 such that side by side racing of objects or vehicles 72 is possible. In this embodiment, a drop down gate is provided wherein a trigger actuated drop down element for the losing lane of the race track is provided. Accordingly, the finish line of the track has two triggers each of which can actuate the drop down element in the opposing track. The triggers are configured to actuate only one drop down gate, allowing the winning vehicle to continue past the finish line while the losing vehicle is released below through a trap door in the track that is opened.

As shown in FIGS. 18A-18C, the track segment is configured to define two track paths 801 and 803 for receipt of vehicles or object 72 thereon. The track segment has a pair of triggers 805 and 807 movably secured thereto and each trigger is aligned with a respective one of the track paths of the track segment. The pair of triggers are each configured to be contacted by an object or vehicle 72 travelling along a respective path of the track segment and the pair of triggers are each configured to be cross-linked to a releasable trap door 809 and 811 of an opposite second path via linkage members such that actuation of trigger 805 in a first path of travel will open door 811 in a second path of travel and actuation of trigger 807 in the second path of travel will open door 809 in the first path of travel.

In addition and in one embodiment, the triggers are further configured that only one trigger will be actuated during each race. Still further, the pair of triggers are configured (e.g., a portion thereof is located in the vehicle path) to be contacted by an incoming vehicle 72. Triggers 805 and 807 can be any type of reloadable triggers known to those skilled in the related arts wherein movement of the trigger from one position to another position releases a catch that allows a trap door to open. The trap doors 809 and 811 are pivotally secured to the track segment and may move to the open position via gravity or a spring biasing force or a combination thereof.

For example and during a race, a movably mounted start gate 823 for each lane can be depressed into an aperture in the track via a lever 825 such that a vehicle or object can roll down the track section towards the triggers 805 and 807. Once the start gate is used to start the race, the race starts and the two vehicles start traversing down the track segment along their respective paths each of which may include curves 827 and gaps 829 for jumping and the first one of the pair of toy vehicles 72 to traverse from the a first path of travel will actuate one of the pair of triggers and open the releasable trap door in front of a second one of pair of toy vehicles traversing in a second path of travel such that the second one of pair of toy vehicles to traverse from the first track segment to the second track segment will fall through an opening in the second track segment while the first one of the pair of toy vehicles to traverse from the first track segment to the second track segment will pass through an exit end of the second track segment. Accordingly, the winner of the race is the first vehicle to traverse the gap and contact one of the triggers thus opening a trapdoor in front of the other vehicle or loser of the race such that the losing vehicle falls through the opening in the track.

Figure 19:
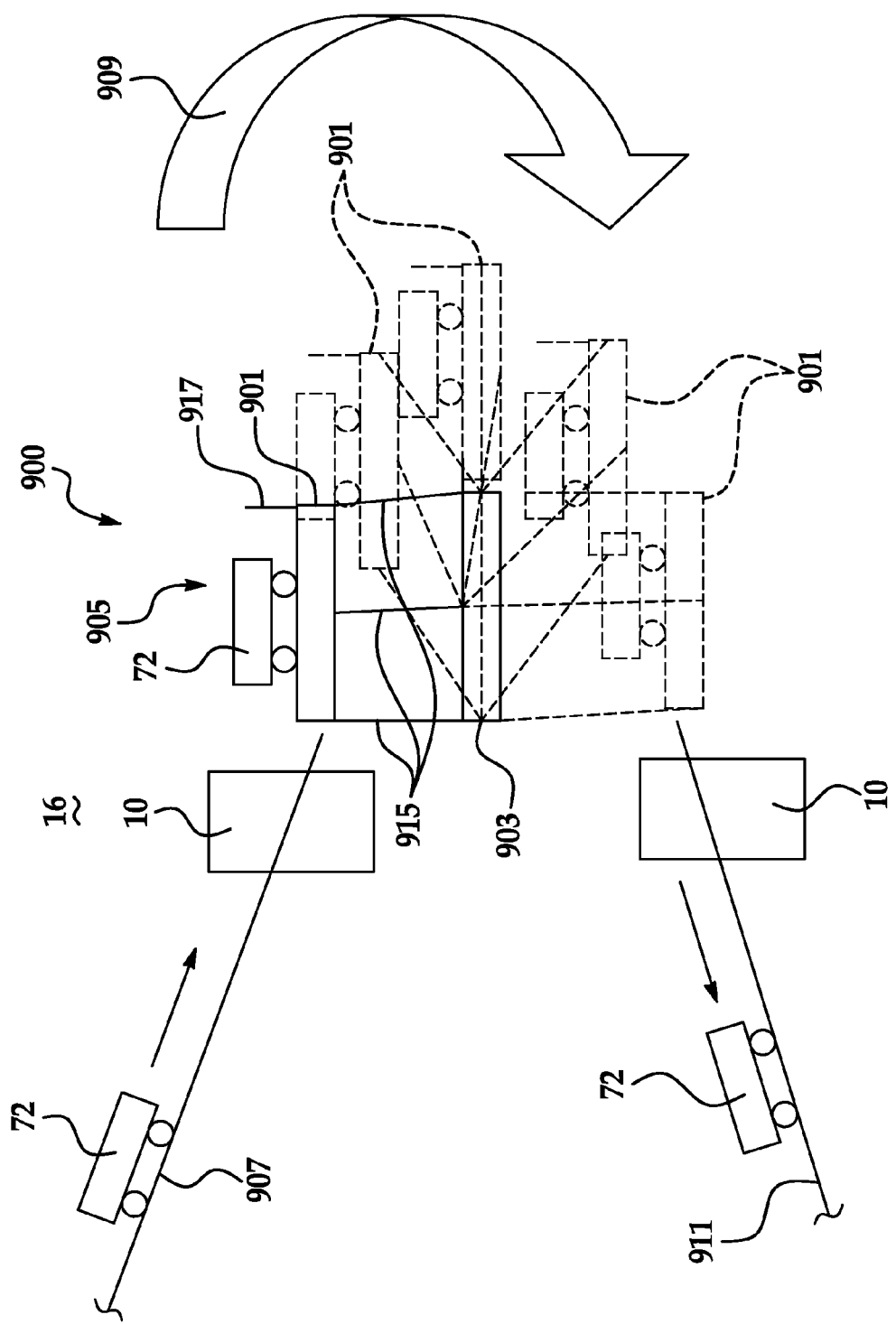
FIG. 19 is an illustration of a swing U-turn device according to another alternative exemplary embodiment of the present invention.

Referring now to FIG. 19, another alternative embodiment of the track set is illustrated. Here a swing device 900 for a track set 902 is mounted to a wall 16 by a plurality of wall mounts 10. In this embodiment, the swing device 900 has a platform 901 pivotally attached to a base 903 and the platform is capable of movement from a first position 905 wherein the platform 901 is adjacent to a first track segment 907 such that a vehicle or object 72 travelling thereon can be received onto the platform 901 and then the platform travels in the direction of arrow 909 wherein the vehicle or object 72 is delivered to a second track segment 911.

The platform 901 is coupled to the base 903 by at least one arm 915 pivotally coupled to the platform 901 at one end and pivotally coupled to the structure or base 903 at an opposing end. This pivotal securement of the arm or arms 915 allows the swing apparatus to rotate about 180 degrees in the vertical axis, while the horizontal pitch of the platform remains unchanged. The momentum of the vehicle travelling into the swing apparatus or onto the platform 901 from track segment 907 of the track set actuates the 180 degree swinging motion, while keeping the vehicle substantially upright. At the conclusion of the 180 degree rotation, the centrifugal force created by the rotating swing is translated to drive the vehicle 72 off the swing apparatus 715 and onto a different portion (second track segment 911) of the track set. The platform may be configured with a stop feature 917 at one end of the platform to prevent the vehicle from travelling off while the other end of the platform is open to allow ingress and egress of the vehicle 72 thereon.

In alternative embodiments, the swing apparatus may be configured to traverse another axis, or combination of axes, while employing the momentum of the vehicle to actuate the swinging motion.

In accordance with an exemplary embodiment and as with all of the aforementioned track sets each track disclosed herein set can be mounted as a stand alone set or be combined with other wall mounted track sets.

In the preceding detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated. This written description uses examples to disclose the invention, including the best mode, and to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting system for mounting a plurality of track segments to a wall, the mounting system comprising:
    a bracket; and
    a track connector, the system having a break away feature that allows the track connector to be removed from the bracket, wherein the track connector is snap fittingly engaged with the bracket when the track connector is secured to the bracket; wherein the bracket further comprises a ledge portion that engages a bottom portion of the track connector and a feature that engages an upper portion of the track connector when track connector is secured to the bracket and wherein the feature snap fittingly engages the track connector when it is secured to the bracket.

2. The mounting system as in claim 1, wherein the track connector further comprises a vertical wall portion and a horizontal mounting portion extending therefrom, the horizontal mounting portion having a shaped aperture configured to receive and engage a complimentary shaped feature secured to and extending away from a bottom surface of a track segment.

3. The mounting system as in claim 2, wherein the shaped aperture and complimentary shaped feature are configured to have a cross shaped configuration.

4. The mounting system as in claim 2, wherein the track connector further comprises a plumb bob indicator that is pivotally mounted to the vertical wall portion.

5. The mounting system as in claim 4, wherein the plumb bob indicator is positioned over an integrally molded feature that includes an arrow portion which corresponds to a vertical orientation of the track connector.

6. The mounting system as in claim 1, wherein the track connector further comprises a plumb bob indicator that is pivotally mounted to the vertical wall portion and wherein the feature is a releasable mechanical fasteners.

7. The mounting system as in claim 6, wherein the plumb bob indicator is positioned over an integrally molded feature that includes an arrow portion which corresponds to a vertical orientation of the track connector and wherein the plumb bob indicator has an arrow portion that is aligned with the arrow portion of the integrally molded feature when the track connector is at a predetermined vertical orientation.

8. A toy vehicle track set, comprising:
    a plurality of wall mounts, each of the plurality of wall mounts having: a planar member; and a corresponding mount member that is snap fittingly engaged with the planar member; wherein the mount member is removable from a front surface of the planar member and wherein the snap fitting engagement of the mount member to the planar member is provided by a ledge portion of the planar member that engages a bottom portion of the mount member and a feature of the planar member that engages an upper portion of the mount member, wherein the mount member further comprises a vertical wall portion and a horizontal mounting portion extending therefrom, the horizontal mounting portion having a shaped aperture configured to receive and engage a complimentary shaped feature secured to a bottom surface of a track segment;

a first track segment configured to engage at least one of the plurality of wall mounts and direct an object in a first direction generally down the first track segment; and a U-turn device configured to receive the object from the first track segment and redirect the object it in a direction substantially opposite to the first direction down a second track segment, wherein the second track segment is also configured to engage at least another one of the plurality of wall mounts.

9. The toy vehicle track set as in claim 8, wherein the U-turn device comprises a spring biased lever that rotates the object approximately 180° with respect to the first direction.

10. The toy vehicle track set as in claim 9, wherein the U-turn device further comprises a pivotally mounted drop member that has a counter weight such that when the drop member is empty a surface of the drop member is positioned to receive the object from the lever and then the weight of the object causes the drop member to rotate downward such that the object can travel onto the second track segment from the first track segment.

11. The toy vehicle track set as in claim 8, further comprising a paper-template, which when placed on the wall a periphery of the template has cutouts portions that locate each of the plurality of wall mounts on the wall in a predetermined pattern and angular configuration when they are placed within the cutouts.

12. The toy vehicle track set as in claim 11, wherein the mount member further comprises a vertical wall portion and a horizontal mounting portion extending therefrom, the horizontal mounting portion having a shaped aperture configured to receive and engage a complimentary shaped feature secured to and extending away from a bottom surface of a track segment.

13. The toy vehicle track set as in claim 12, wherein the shaped aperture and complimentary shaped feature are configured to have a cross shaped configuration.

14. The toy vehicle track set as in claim 12, wherein the object is a toy vehicle.

15. The toy vehicle track set as in claim 12, wherein the mount member further comprises a plumb bob indicator that is pivotally mounted to the mount member and wherein the plumb bob indicator is positioned over an integrally molded feature that includes an arrow portion which corresponds to a vertical orientation of the mount member.

16. The toy vehicle track set as in claim 11, wherein the mount member further comprises a plumb bob indicator that is pivotally mounted to the mount member.

17. The toy vehicle track set as in claim 16, wherein the plumb bob indicator is positioned over an integrally molded feature that includes an arrow portion which corresponds to a vertical orientation of the mount member and wherein the plumb bob indicator has an arrow portion that is aligned with the arrow portion of the integrally molded feature when the track connector is at a predetermined vertical orientation.

18. The toy vehicle track set as in claim 8, wherein the U-turn device comprises a swing platform that receives and rotates the object approximately 180° with respect to the first direction and thereafter the object travels in a direction substantially opposite to the first direction to be received in a pivotally mounted see saw track member located on a second track segment.

19. The toy vehicle track set as in claim 18, further comprising a paper-template, which when placed on the wall a periphery of the template has cutouts portions that locate each of the plurality of wall mounts on the wall in a predetermined pattern and angular configuration when they are placed within the cutouts.

20. The toy vehicle track set as in claim 19, wherein the mount member further comprises a plumb bob indicator that is pivotally mounted to the mount member and wherein the plumb bob indicator is positioned over an integrally molded feature that includes an arrow portion which corresponds to a vertical orientation of the mount member.

21. The toy vehicle track set as in claim 8, wherein the feature is a releasable mechanical fastener.

22. A mounting system for mounting a plurality of track segments to a wall, the mounting system comprising a plurality of wall mounts each of the wall mounts comprising:

a bracket; and a track connector, the system having a break away feature that allows the track connector to be removed from the bracket, the track connector having a vertical wall portion with a peripheral edge that is snap fittingly engaged with the bracket when the track connector is secured to the bracket, the bracket having a lower portion that engages a bottom portion of the vertical wall portion when track connector is secured to the bracket and a feature that engages an upper portion of the vertical wall portion when track connector is secured to the bracket, wherein the feature snap fittingly engages the track connector when it is secured to the bracket.

23. The mounting system as in claim 22, wherein the peripheral edge of the vertical wall is slightly smaller than the bracket.

* * * * *